United States Patent
Xu et al.

(10) Patent No.: US 12,156,266 B2
(45) Date of Patent: Nov. 26, 2024

(54) SESSION SETUP METHOD, SESSION MANAGEMENT FUNCTIONAL ENTITY, BASE STATION, AND STORAGE MEDIUM

(71) Applicant: Samsung Electronics Co., Ltd., Suwon-si (KR)

(72) Inventors: Lixiang Xu, Beijing (CN); Weiwei Wang, Beijing (CN); Hong Wang, Beijing (CN); Xiaoning Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 480 days.

(21) Appl. No.: 17/290,420

(22) PCT Filed: Nov. 1, 2019

(86) PCT No.: PCT/KR2019/014571
§ 371 (c)(1),
(2) Date: Apr. 30, 2021

(87) PCT Pub. No.: WO2020/091449
PCT Pub. Date: May 7, 2020

(65) Prior Publication Data
US 2021/0392704 A1    Dec. 16, 2021

(30) Foreign Application Priority Data

Nov. 1, 2018  (CN) .......................... 201811298946.5
Apr. 28, 2019 (CN) .......................... 201910353136.3
(Continued)

(51) Int. Cl.
*H04W 76/12* (2018.01)
*H04L 1/1607* (2023.01)
(Continued)

(52) U.S. Cl.
CPC .......... *H04W 76/12* (2018.02); *H04L 1/1642* (2013.01); *H04L 1/1896* (2013.01);
(Continued)

(58) Field of Classification Search
CPC ..... H04W 76/12; H04W 36/32; H04W 48/18; H04L 1/1642; H04L 1/1806
(Continued)

(56) References Cited

U.S. PATENT DOCUMENTS 11,304,092 B2 *   4/2022  Park ..................... H04W 60/06
2017/0339609 A1  11/2017  Youn et al.
(Continued)

FOREIGN PATENT DOCUMENTS

CN          108282817 A      7/2018
KR    10-2018-0106804 A1    10/2018
WO         2018/194315 A1   10/2018

OTHER PUBLICATIONS

S2-1811217 (Year: 2018).*
(Continued)

*Primary Examiner* — Intekhaab A Siddiquee
(74) *Attorney, Agent, or Firm* — Jefferson IP Law, LLP

(57) ABSTRACT

The disclosure relates to a pre-5th-generation (5G) or 5G communication system to be provided for supporting higher data rates Beyond 4th-generation (4G) communication system such as long term evolution (LTE). The embodiments of the disclosure provide a session setup method, including: receiving a message for creating a session management context; selecting a user plane functional entity (UPF) for redundant session processing in response to the message; and setting up a packet data unit (PDU) session corresponding to the UPF. There are further provided a session setup
(Continued)

method for a base station and related devices. The above technical solutions can realize reliability of service transmission.

14 Claims, 9 Drawing Sheets

(30) Foreign Application Priority Data

Apr. 30, 2019 (CN) .......................... 201910366972.5
Jul. 17, 2019 (CN) .......................... 201910648929.8

(51) Int. Cl.
*H04L 1/1867* (2023.01)
*H04W 36/00* (2009.01)
*H04W 36/32* (2009.01)
*H04W 48/18* (2009.01)

(52) U.S. Cl.
CPC ..... *H04W 36/00695* (2023.05); *H04W 48/18* (2013.01); *H04W 36/13* (2023.05)

(58) Field of Classification Search
USPC .......................................................... 370/329
See application file for complete search history.

(56) References Cited

U.S. PATENT DOCUMENTS

| | | | |
|---|---|---|---|
| 2018/0176810 A1 | 6/2018 | Thangarasa et al. | |
| 2018/0279375 A1 | 9/2018 | Jeon et al. | |
| 2019/0364463 A1 | 11/2019 | Youn et al. | |
| 2020/0077357 A1 | 3/2020 | Park et al. | |

OTHER PUBLICATIONS

S2-1811440 (Year: 2018).*
3GPP TS 23.502 (Year: 2018).*
Extended European Search Report dated Mar. 15, 2022, issued in a counterpart European Application No. 19878584.2.
Ericsson; Clarifications to solution #1 on dual connectivity based user plane redundancy; 3GPP TSG-SA WG2 Meeting #128bis; S2-188904, (revision of 187765), Aug. 26, 2018, Sophia Antipolis, France.
Ericsson; Clarifications to solution #2 on multiple UEs for user plane redundancy; 3GPP TSG-SA WG2 Meeting #129; S2-1811213, (revision of 187766); Aug. 26, 2018, Dongguan, P.R. China.
Ericsson, Qualcomm Inc.; Evaluation of Solution #3, Supporting redundant data transmission via single UPF and two RAN nodes; 3GPP TSG-SA WG2 Meeting #129; S2-1811216, (revision of 18xxxx); Oct. 17, 2018, Dongguan, P.R. China.
Huawei, HiSilicon; Resolve ENs for Solution#3 and Solution#4; SA WG2 Meeting #129; S2-1811217, (revision of S2-1810471); Oct. 18, 2018, Dongguan, P.R. China.
Ericsson; Evaluation of Solution #1 : Redundant user plane paths based on dual connectivity; 3GPP TSG-SA WG2 Meeting #129; S2-1811440, (revision of 18xxxx); Oct. 18, 2018, Dongguan, P.R. China.
Ericsson; Potential Impacts of Higher Layer Multi-Connectivity related to the Key Issue 1; 3GPP TSG-RAN WG3 Meeting #101 bis; R3-186254; Oct. 15, 2018, Dongguan, P.R. China.
3GPP TS 23.502 V15.3.0; 3rd Generation Partnership Project; Technical Specification Group Services and System Aspects; Procedures for the 5G System; Stage 2 (Release 15), Sep. 17, 2018.
3GPP TR 23.725 V1.0.0; 3rd Generation Partnership Project; Technical Specification Group Services and System Aspects; Study on enhancement of Ultra-Reliable Low-Latency Communication (URLLC) support in the 5G Core network (5GC), Sep. 2018. (Release 16).
Ericsson; Clarifications to solution #2 on multiple UEs for user plane redundancy; 3GPP TSG-SA WG2 Meeting #129 S2-1810104 (revision of S2-1810414); Agenda Item: 6.20; Oct. 2018, Dongguan, P. R. China.
Nokia, Nokia Shanghai Bell; Update to Solution #9—new IPV6 address allocation mechanisms; SA WG2 Meeting #129 S2-1810925; Agenda Item: 6.7; Oct. 2018, Dongguan, PRC.
Ericsson, Evaluation of Solution #1: Redundant user plane paths based on dual connectivity, 3GPP TSG-SA WG2 Meeting #129, S2-1811378, Oct. 18, 2018.
3rd Generation Partnership Project; Technical Specification Group Services and System Aspects; Study on enhancement of Ultra-Reliable Low-Latency Communication (URLLC) support in the 5G Core network (5GC) (Release 16), 3GPP TR 23.725 V0.4.0, Aug. 2018, 023725-040-rm.
Chinese Office Action dated Aug. 30, 2023, issued in Chinese Patent Application No. 201910648929.8.

* cited by examiner

[Fig. 1]
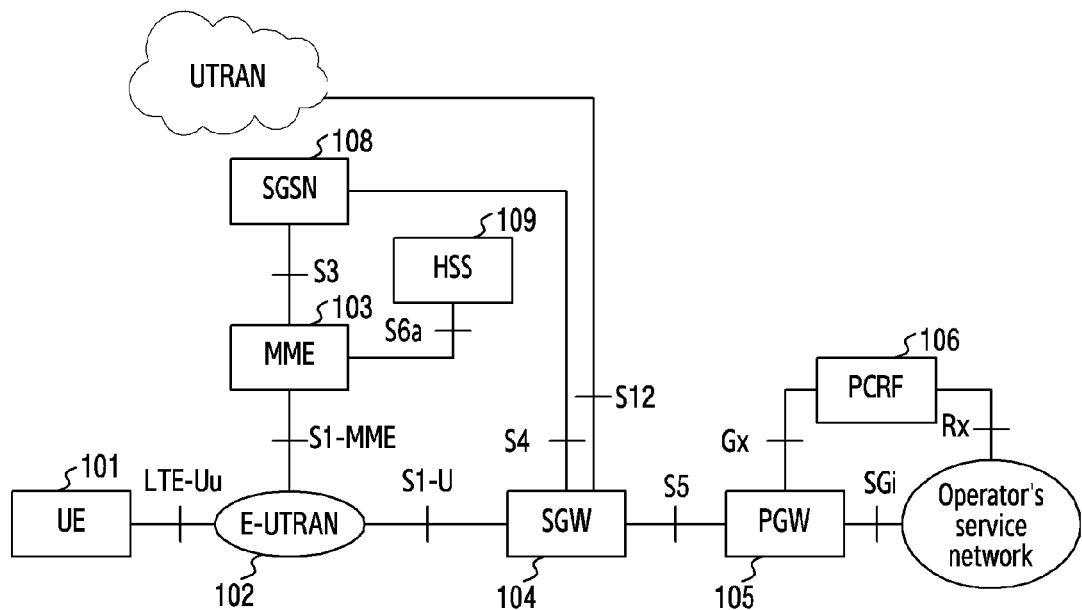
[Fig. 2]
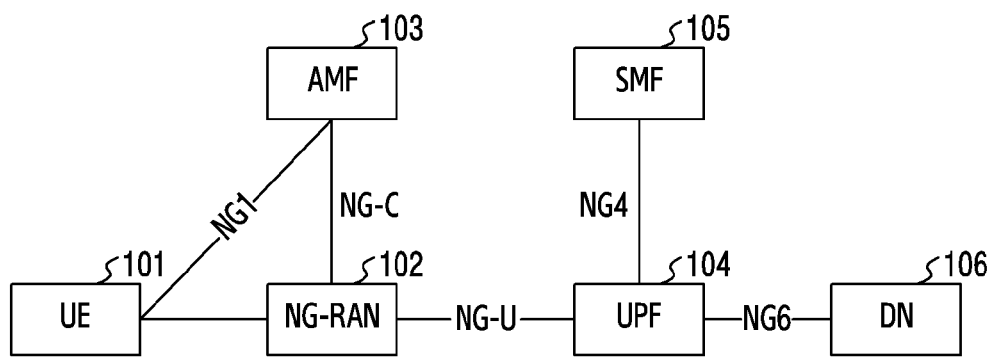

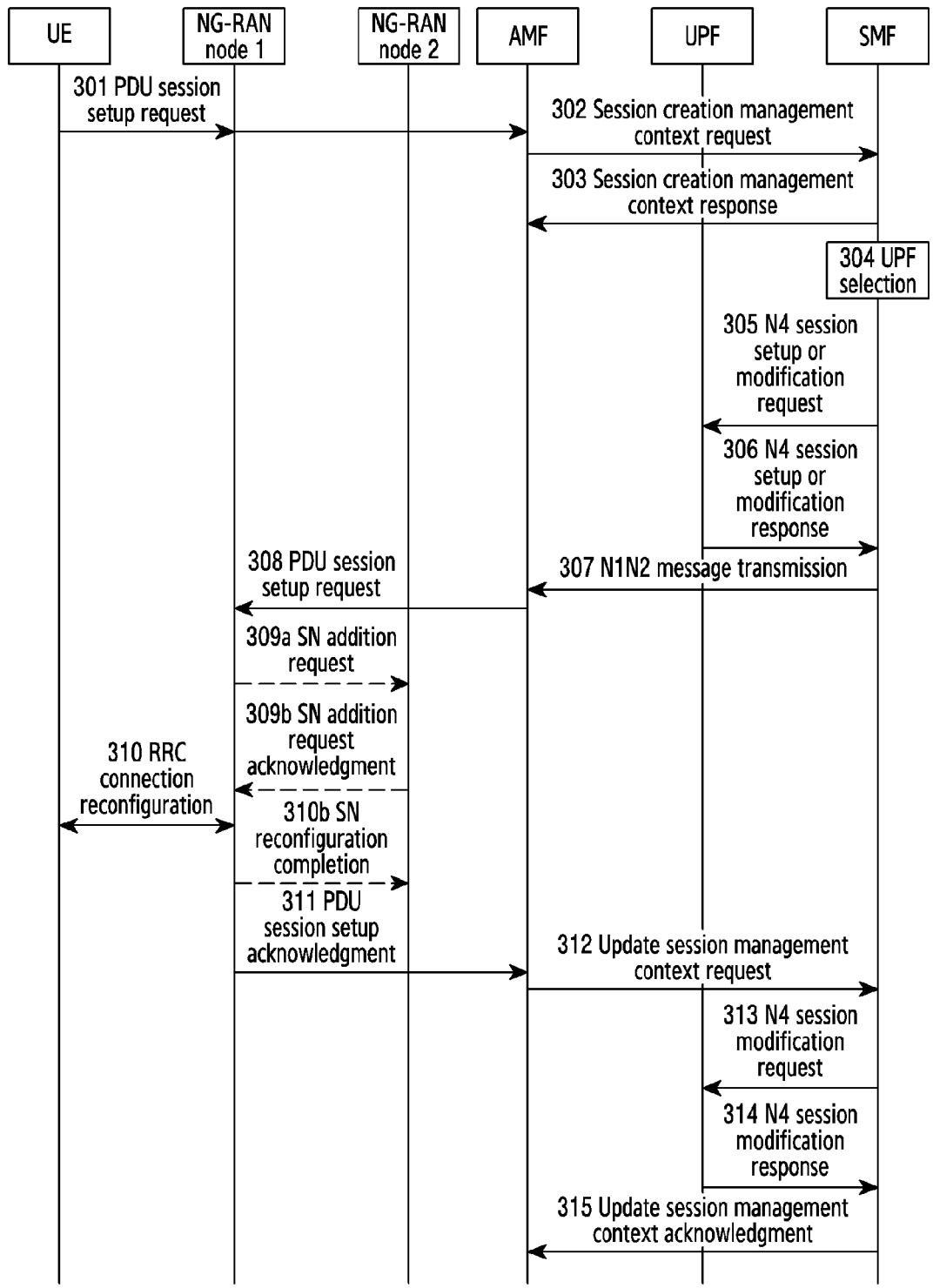
[Fig. 3]

[Fig. 9]
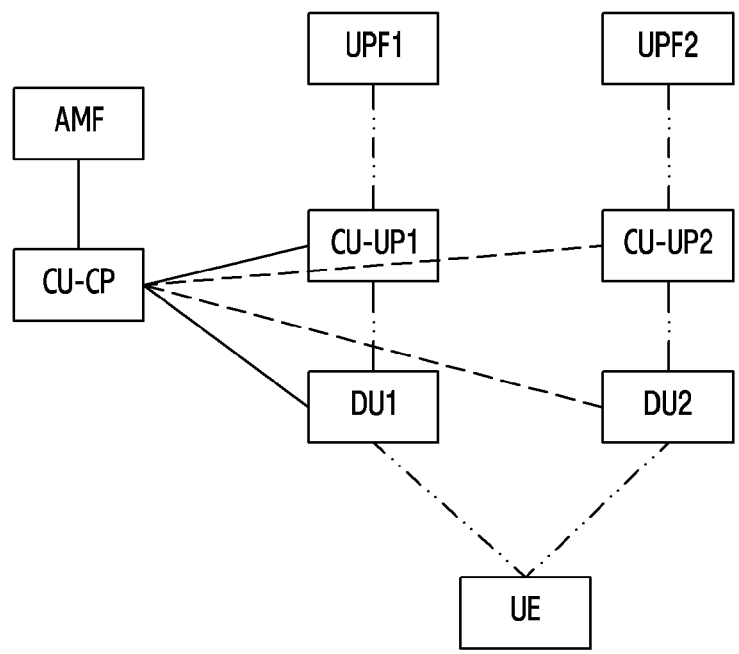
[Fig. 10]
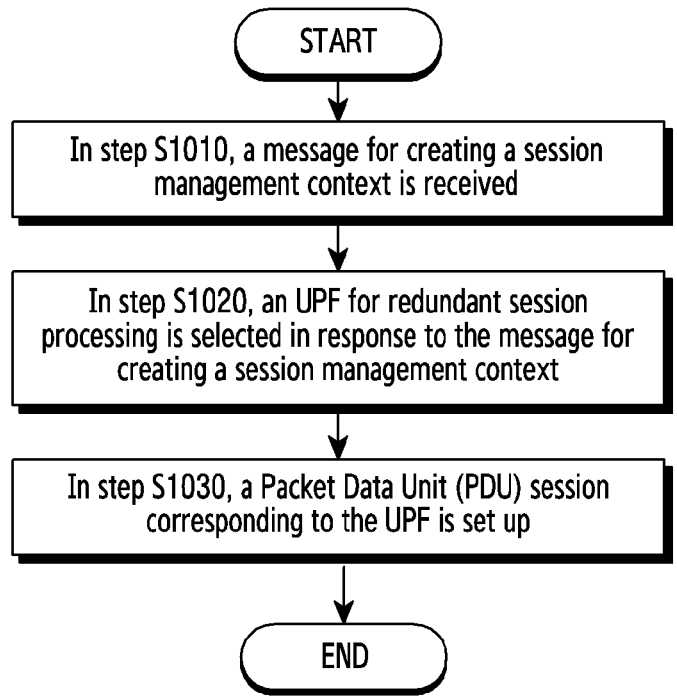

[Fig. 11]
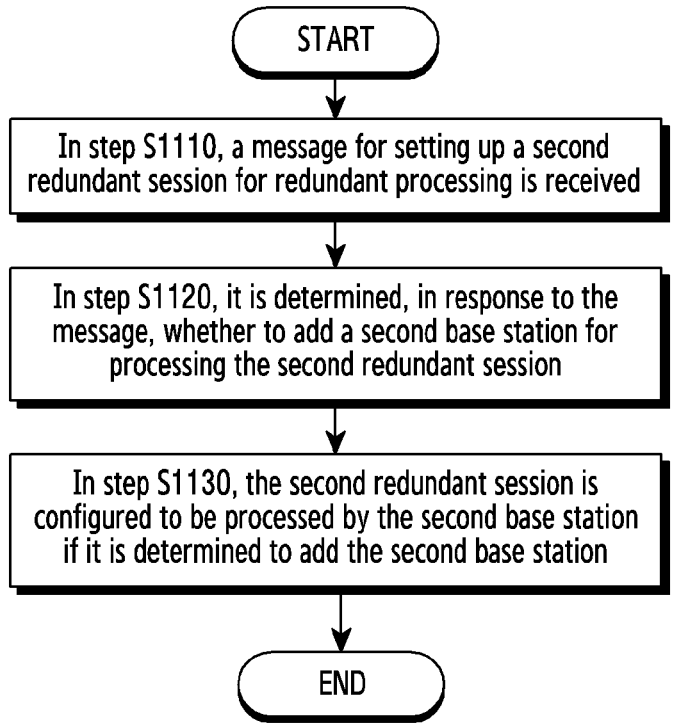
[Fig. 12]
SMF 1200
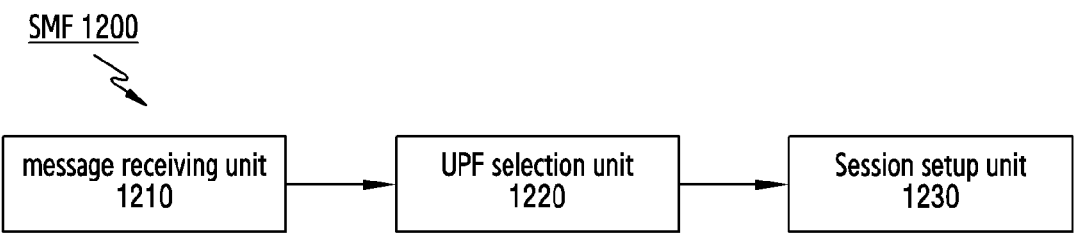
[Fig. 13]
Base station 1300
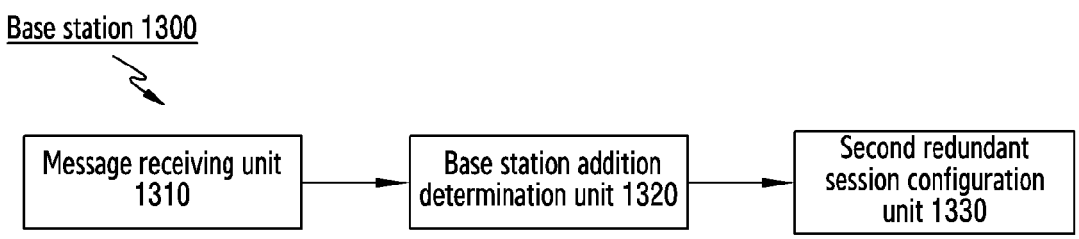

[Fig. 14]
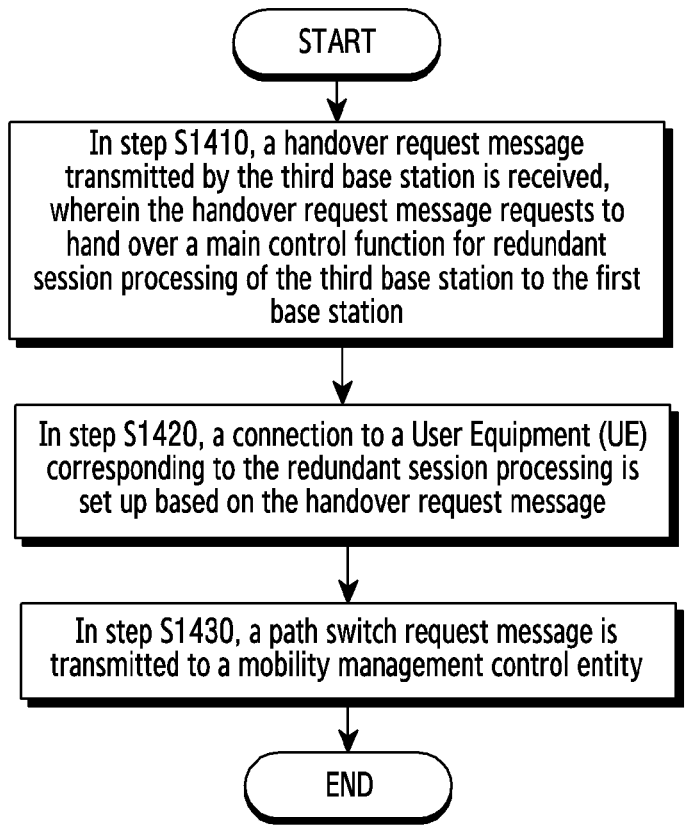
[Fig. 15]
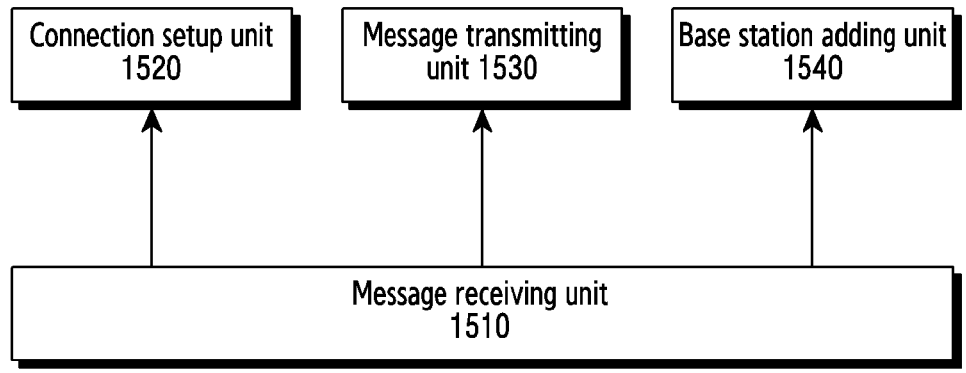

[Fig. 16]
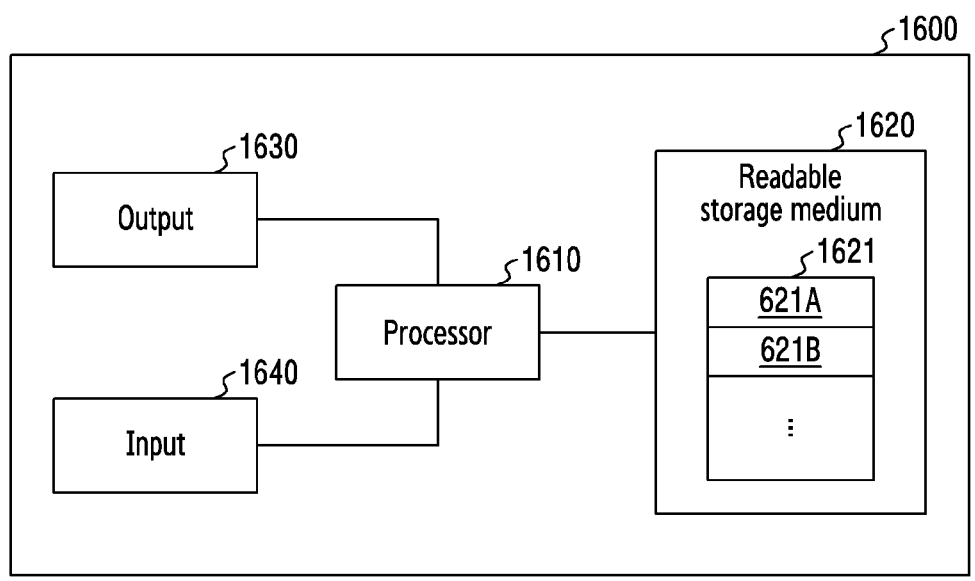

SESSION SETUP METHOD, SESSION MANAGEMENT FUNCTIONAL ENTITY, BASE STATION, AND STORAGE MEDIUM

TECHNICAL FIELD

The disclosure relates to the field of communication technologies, and more particularly, the disclosure relates to a session setup method, a session management functional entity, a base station, and a storage medium.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Modern mobile communications are increasingly tending to provide users with multimedia services which are transmitted at a high speed, and some of the multimedia services are required to be highly reliably transmitted with low delay. In order to support such a feature, there is proposed a concept of ensuring reliability of service transmission by setting up two packet data unit (PDU) sessions through two user plane functional entities (UPFs). However, there is no specific solution on how to set up the two PDU sessions.

Therefore, there is a need for a solution of setting up sessions to achieve highly reliable service transmission.

DISCLOSURE OF INVENTION

Solution to Problem

To this end, the embodiments of the disclosure propose a session setup method, a session management functional entity, a base station, and a storage medium.

According to a first aspect of the disclosure, there is provided a session setup method, comprising:
  receiving a message for creating a session management context;
  selecting a user plane functional entity (UPF) for redundant session processing in response to the message for creating a session management context; and
  setting up a packet data unit (PDU) session corresponding to the UPF.

In some embodiments, selecting an UPF for redundant session processing in response to the message for creating a session management context comprises:
  determining that a session for which the session management context needs to be created is a redundant session and whether the redundant session is a first redundant session or a second redundant session based on at least one of:
  information related to the redundant session contained in the message for creating a session management context; and
  a data network name (DNN) or single network slice selection assistance information (S-NSSAI) and an operator's network configuration; and
  selecting, based on the determination, the UPF for redundant session processing according to an identity of a serving base station of a user equipment (UE).

In some embodiments, the method further comprises:
  receiving a first base station identity of a base station where the first redundant session is to be set up and a second base station identity of a base station where the second redundant session is to be set up, selecting an UPF for the first redundant session according to the first base station identity, and selecting an UPF for the second redundant session according to the second base station identity; or
  receiving a base station identity of a base station where the second redundant session is to be set up, and selecting an UPF for the second redundant session according to the base station identity.

According to a second aspect of the disclosure, there is provided a session setup method, wherein a first base station sets up a first redundant session for redundant handling, the method comprising:
  receiving a message for setting up a second redundant session for redundant handling;
  determining, in response to the message, whether to add a second base station for processing the second redundant session; and
  configuring the second redundant session to be processed by the second base station if it is determined to add the second base station.

In some embodiments, determining, in response to the message, whether to add a second base station for processing the second redundant session comprises:
  determining whether the first base station supports dual connectivity for the first redundant session and the second redundant session; and
  if the first base station supports the dual connectivity, determining to add the second base station to configure the second redundant session to be processed by the second base station; otherwise, determining not to add the second base station.

In some embodiments, the method further comprises:
  storing information required to set up the second redundant session in a case that the first base station does not support the dual connectivity; and
  when it is determined that the first base station is capable of supporting the dual connectivity, determining to add the second base station using the stored information to configure the second redundant session to be processed by the second base station.

In some embodiments, configuring the second redundant session to be processed by the second base station comprises:
- requesting the second base station to set up the second redundant session on the second base station;
- receiving, from the second base station, an acknowledgement message accepting setup of the second redundant session;
- receiving resources configured by a user equipment for the second redundant session; and
- transmitting the configured resources to the second base station to set up the second redundant session on the second base station.

Alternatively, configuring the second redundant session to be processed by the second base station comprises:
- setting up the second redundant session on the first base station;
- requesting the second base station to set up the second redundant session on the second base station;
- receiving, from the second base station, an acknowledgement message accepting setup of the second redundant session;
- receiving resources configured by the user equipment for the second redundant session; and
- handing over the second redundant session to the second base station using the configured resources.

According to a third aspect of the disclosure, there is provided a method for handing over a master base station for redundant session processing, comprising:
- receiving a handover request message transmitted by a third base station, wherein the handover request message requests to hand over a main control function for redundant session processing of the third base station to a first base station;
- setting up a connection to a user equipment (UE) corresponding to the redundant session processing based on the handover request message; and
- transmitting a path switch request message to a mobility management control entity.

In some embodiments, the method further comprises:
- in response to the handover request message, adding a fourth base station for processing a second redundant session in redundant sessions of the third base station.

According to a fourth aspect of the disclosure, there is provided a session management functional entity, comprising:
- a processing unit; and
- a storage unit having stored thereon machine readable instructions which, when executed by the processing unit, configure the processing unit to perform the method according to the first aspect described above.

According to a fifth aspect of the disclosure, there is provided a base station, comprising:
- a processing unit; and
- a storage unit having stored thereon machine readable instructions which, when executed by the processing unit, configure the processing unit to perform the method according to the second aspect described above.

According to a sixth aspect of the disclosure, there is provided a session management functional entity, comprising:
- a message receiving unit, configured to receive a message for creating a session management context;
- a user plane functional entity (UPF) selection unit, configured to select an UPF for redundant session processing in response to the message for creating a session management context; and
- a session setup unit, configured to set up a packet data unit (PDU) session corresponding to the UPF.

According to a seventh aspect of the disclosure, there is provided a base station, comprising:
- a message receiving unit, configured to receive a message for setting up a second redundant session for redundant handling;
- a base station addition determination unit, configured to determine, in response to the message, whether to add a second base station for processing the second redundant session; and
- a second redundant session configuration unit, configured to configure the second redundant session to be processed by the second base station if it is determined to add the second base station.

According to an eighth aspect of the disclosure, there is provided a base station, comprising:
- a message receiving unit, configured to receive a handover request message transmitted by a third base station, wherein the handover request message requests to hand over a main control function for redundant session processing of the third base station to a first base station;
- a connection setup unit, configured to set up, based on the handover request message, a connection to a user equipment (UE) corresponding to the redundant session processing; and
- a message transmitting unit, configured to transmit a path switch request message to a mobility management control entity.

According to a ninth aspect of the disclosure, there is provided a computer readable storage medium, having stored thereon executable instructions which, when executed by a processor, cause the processor to perform the method according to the first aspect described above or the method according to the second aspect described above.

The embodiments of the disclosure ensure the reliability of service transmission by setting up two redundant PDU sessions on two base stations respectively.

BRIEF DESCRIPTION OF DRAWINGS

The above and additional aspects and advantages of the present application will become more apparent and readily understood from the following description in conjunction with accompanying drawings, in which:

FIG. 1 illustrates a system architecture diagram of system architecture evolution (SAE).

FIG. 2 is a system architecture diagram of a next generation network or a 5th generation (5G) network.

FIG. 3 illustrates a schematic diagram of a session setup method according to an embodiment of the disclosure.

FIG. 9 schematically illustrates a schematic diagram of a system supporting reliable session transmission according to an embodiment of the disclosure.

FIG. 10 illustrates a schematic flowchart of a session setup method according to an embodiment of the disclosure.

FIG. 11 illustrates a schematic flowchart of another session setup method according to an embodiment of the disclosure.

FIG. 12 illustrates a schematic block diagram of a session management function entity (SMF) for session setup according to an embodiment of the disclosure.

FIG. 13 illustrates a schematic block diagram of a base station for session setup according to an embodiment of the disclosure.

FIG. 14 illustrates a schematic flowchart of a method for handing over a master base station for redundant session processing according to an embodiment of the disclosure.

FIG. 15 illustrates a schematic block diagram of a device for handing over a master base station for redundant session processing according to an embodiment of the disclosure.

FIG. 16 schematically illustrates a block diagram of a computing system which may be used to implement an SMF or a base station of the disclosure, according to an embodiment of the disclosure.

Figure 4:
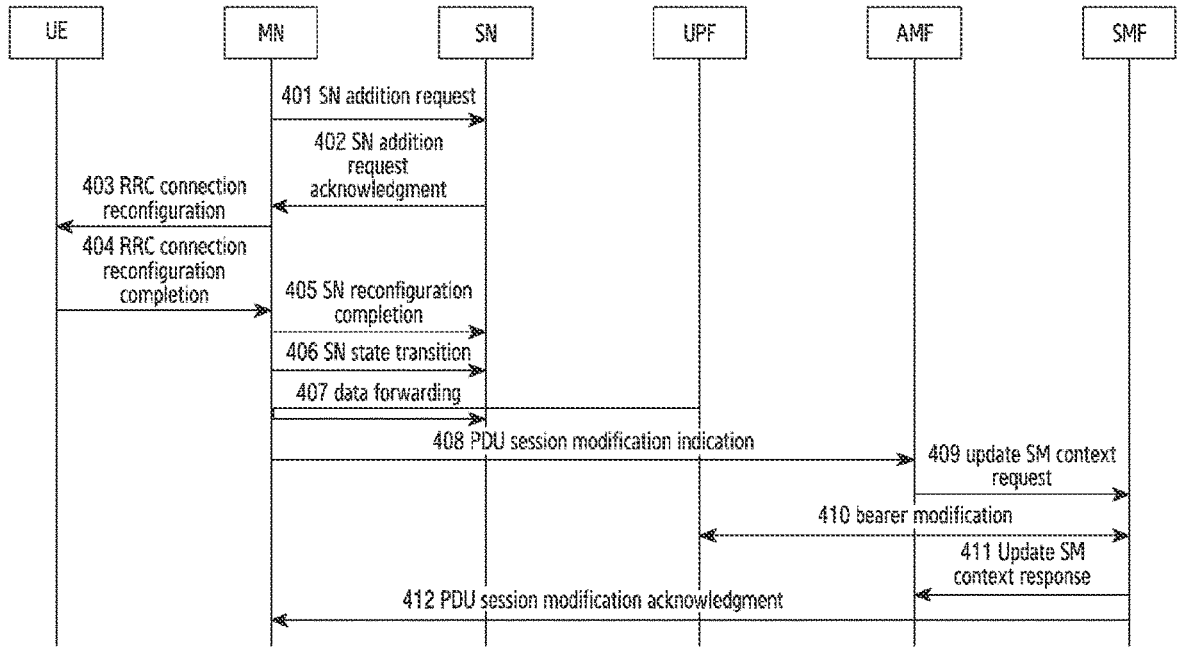
FIG. 4 schematically illustrates a schematic diagram of a method for handing over a second PDU session to a secondary base station according to an embodiment of the disclosure.

In the accompanying drawings, the same or similar structures are identified by the same or similar reference signs.

BEST MODE FOR CARRYING OUT THE INVENTION

The disclosure will be described in detail below in conjunction with accompanying drawings and specific embodiments. It should be illustrated that the disclosure should not be limited to specific embodiments described below. The specific embodiments illustrated herein are exemplary, and are merely used to explain the disclosure, but cannot be construed as limiting the disclosure. Further, for brevity, detailed description of well-known techniques which are not directly associated with the disclosure is omitted, to avoid confusion of the understanding of the disclosure.

It can be understood by those skilled in the art that singular forms "a", "an", "the" used here may also comprise plural forms, unless otherwise stated. It should also be understood that phrase "comprise" used in the specification of the disclosure refers to presence of the features, integers, steps, operations, elements and/or components, but should not preclude the presence or addition of one or more other features, integers, steps, operations, elements, components, and/or groups thereof. It should be understood that when an element is referred to as being "connected" or "coupled" to another element, it may be directly connected or coupled to the other element, or there may be an intermediate element therebetween. Further, "connected" or "coupled" as used here may comprise either a wireless connection or a wireless coupling. The phrase "and/or" used here comprises all or any of one or more of associated listed items, or all combinations thereof.

It can be understood by those skilled in the art that all terms (comprising technical and scientific terms) used here have the same meaning as commonly understood by those of ordinary skill in the art to which the disclosure belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

FIG. 1 illustrates a system architecture diagram of system architecture evolution (SAE). Here, a user equipment (UE) 101 is a terminal device for receiving data. An evolved universal terrestrial radio access network (E-UTRAN) 102 is a radio access network which comprises a macro-base station (eNodeB/NodeB) for providing the UE with an interface for accessing the radio network. A mobility management entity (MME) 103 is responsible for managing a mobile context, a session context and security information of the UE. A serving gateway (SGW) 104 primarily provides functionality of a user plane, and may be located in the same physical entity as the MME 103. A packet data network gateway (PGW) 105 is responsible for functions such as charging, lawful interception, etc., and may also be located in the same physical entity as the SGW 104. A policy and charging rules function entity (PCRF) 106 provides quality of service (QoS) policies and charging criteria. A general packet radio service support node (SGSN) 108 is a network node device in a universal mobile telecommunications system (UMTS) which provides routing for data transmission. A home subscriber server (HSS) 109 is a home sub-system of the UE and is responsible for protecting user information, comprising a current location of the UE, an address of a serving node, user security information, and a packet data context of the UE etc.

FIG. 2 is a system architecture diagram of a next generation network or a 5G network. Here, a UE 101 is a terminal device for receiving data. A next generation-radio access network (NG-RAN) 102 is a radio access network comprising a base station (gNB or eNB connected to a 5G core network (5GC)), which provides the UE with an interface for accessing the radio network. An access control and mobility management function entity (AMF) 103 is responsible for managing a mobile context and security information of the UE. A user plane functional entity (UPF) 104 primarily provides functionality of a user plane. A session management function entity (SMF) 105 is responsible for session management. A data network (DN) 106 comprises, for example, an operator's services, Internet access, and a third-party's services etc.

In order to support highly reliable service transmission with low delay, in the Rel-15, considerations are mainly directed to an air interface, and the same architecture and session setup method are used for supporting various services on a network side.

In order to support the highly reliable service transmission with low delay, one solution discussed now is to set up a redundant user plane, that is, to set up two PDU sessions through two UPFs to ensure the reliability of the service transmission. However, there is no specific discussion on how to set up the two PDU sessions, especially how to select an appropriate UPF during the setup of the PDU sessions, how to support the handover etc.

The solution according to the disclosure will be described in detail below with reference to the accompanying drawings.

FIG. 3 illustrates a schematic diagram of a session setup method according to an embodiment of the disclosure.

Detailed description of the steps unrelated to the disclosure is omitted here. The method comprises the following steps.

In step 301, a UE transmits a PDU session setup request message to an AMF. The UE transmits the PDU session setup request message to a base station through an RRC message. The base station transmits the PDU session setup request message to the AMF through an NG access protocol (AP) message. Here, the base station is an NG-RAN node 1. The PDU session setup request message comprises a redundant sequence number (RSN). The RSN indicates redundant handling. A value of the RSN indicates whether a first PDU session or a second PDU session is to be set up.

In step 302, the AMF transmits a session creation management context request message to an SMF.

In the present embodiment, there are three methods for selecting an UPF.

In a first method, for each of a first PDU session and a second PDU session for redundant handling, an UPF is selected according to an identity of a master base station. For this method, in this step, the AMF transmits a base station identity of a base station accessed by the UE to the SMF, or the NG-RAN node 1 transmits, via the AMF, an identity of a master base station or an identity of a cell of the master base station accessed by the UE to the SMF. The cell here is a primary cell of the master base station accessed by the UE, as described in detail below.

In a second method, in step 304, the SMF selects an UPF according to an existing mechanism. In step 311 and step 312, at the NG-RAN node 1, an identity of a base station where each PDU session is to be set up or the identity of the cell of the base station accessed by the UE is included in a PDU session setup acknowledgement message which is transmitted to the SMF through the AMF. The SMF reselects UPFs for the first PDU session and the second PDU session respectively. Here, the SMF selects the UPFs for the first PDU session and the second PDU session in consideration of an identity of a master base station and an identity of a secondary base station respectively. The cell of the base station accessed by the UE here is a primary cell of the base station accessed by the UE, for example, a primary cell of the master base station or a primary cell of the secondary base station, which is true throughout the disclosure, and will not be described again when the cell of the base station accessed by the UE is cited below. If the identity of the cell of the base station accessed by the UE is received by the SMF, the SMF may obtain an identity of the base station according to the identity of the cell, which is true below and will not be described again. The SMF may select UPFs which are close to the master base station and the secondary base station respectively.

In a third method, for a first PDU session and a second PDU session for redundant handling, the SMF selects UPFs according to an identity of a master base station in step 304, as described in detail in step 304 below. In step 311 and step 312, at the NG-RAN node 1, an identity of a secondary base station where the second PDU session is to be set up is included in a PDU session setup acknowledgement message which is transmitted to the SMF through the AMF, and the SMF reselects an UPF for the second PDU session. The SMF selects the UPF for the second PDU session in consideration of the identity of the secondary base station or the identity of the cell of the secondary base station. If the SMF receives the identity of the cell of the base station, the SMF may obtain the identity of the base station according to the identity of the cell. The SMF may select an UPF which is close to the secondary base station. It should be illustrated that for convenience of description, in the method according to the disclosure, a method for setting up dual connectivity for a PDU session for redundant handling is described by taking setup of the first PDU session at the master base station and setup of the second PDU session at the secondary base station as an example. In practical applications, which PDU session is set up at the master base station and which PDU session is set up at the secondary base station may be decided by the SMF or the NG-RAN. In correspondence to a method decided by the SMF, the SMF indicates the information to the NG-RAN through the RSN.

The AMF transmits the base station identity of the base station accessed by the UE or the identity of the cell of the base station accessed by the UE to the SMF. The AMF receives an NGAP message from the base station, and thereby knows the base station accessed by the UE. Here, the base station is the NG-RAN node 1.

In step 303, the SMF transmits a session creation management context response message to the AMF.

In step 304, the SMF selects an UPF. The SMF selects the UPF in consideration of the base station identity or the cell identity received from the AMF. The base station identity received by the SMF may be an identity of a master base station or an identity of an secondary base station. The secondary base station may also be referred to as a second base station. If the SMF receives the identity of the cell of the base station, the SMF may obtain the base station identity according to the cell identity. The SMF knows that the PDU session is used for redundant handling based on the RSN received from the UE or based on a data network name (DNN) or single network slice selection assistance information (S-NSSAI) and network configuration and knows whether the PDU session is the first PDU session or the second PDU session. The SMF selects the UPF in consideration of information that the PDU session is the first PDU session for redundant handling and the received base station identity or cell identity. When the SMF does not receive the RSN from the UE, the SMF may decide to set up the first PDU session or the second PDU session for redundant handling using the DNN or S-NSSAI in conjunction with an operator's configuration. The SMF selects the UPF using the information that the first PDU session or the second PDU session is to be set up in combination with other information.

In step 305, the SMF transmits an N4 session setup request message or N4 session modification request message to the selected UPF. If the request is an initial request, the SMF initiates an N4 session setup procedure to the selected UPF; otherwise, the SMF initiates an N4 session modification procedure to the selected UPF.

In step 306, the UPF transmits an N4 session setup response or an N4 session modification response message to the SMF.

In step 307, the SMF transmits an N1N2 message transmission message to the AMF. The message comprises a PDU session identity, N2 session management (SM) information, and an N1 session container. The message contains information on redundant PDU session handling. The information on redundant PDU session handling may indicate whether the PDU session is the first PDU session or the second PDU session using the RSN. The information on redundant PDU session handling may further indicate an association relationship between the two PDU sessions for redundant handling. The SMF may configure the same RSN value for the two PDU sessions in order to indicate that the two PDU sessions are associated PDU sessions for redundant handling.

In step 308, the AMF transmits a PDU session setup request message to the NG-RAN node 1. The message comprises information on redundant PDU session handling. The information on redundant PDU session handling may indicate whether the PDU session is the first PDU session or the second PDU session using the RSN. The information on redundant PDU session handling may also indicate an association relationship between the two PDU sessions for redundant handling, so as to, for example, inform the NG-RAN node 1 of which two PDU sessions are used for redundant handling. RSNs for the two PDU sessions in the message may be configured with the same value to inform the NG-RAN node 1 that the two PDU sessions are associated PDU sessions for redundant handling. The association between two PDU sessions for redundant handling may be indicated in the same way throughout the specification, and then description thereof will be omitted.

The NG-RAN node 1 knows, according to the received PDU session setup request message, that the PDU session to be set up is used for redundant handling. The NG-RAN node 1 also knows whether the PDU session to be set up is the first PDU session or the second PDU session, or the NG-RAN node 1 may also know which two PDU sessions are used for redundant handling. If the PDU session to be set up is used for redundant handling and the PDU session to be set up is the second PDU session, the NG-RAN node 1 sets up the second PDU session on a base station different from that of the first PDU session. For example, if the first PDU session is a bearer terminated by a main node (MN), the second PDU session needs to be set up as a bearer terminated by a secondary node (SN). As an implementation method of the disclosure, the first PDU session is to be set up as a bearer terminated by the MN, and the second PDU session is to be set up as a bearer terminated by the SN. It is also feasible that the first PDU session is to be set up as a bearer terminated by the SN, and the second PDU session is to be set up as a bearer terminated by the MN. Whether an MCG bearer, an SCG bearer, or a split bearer is used for underlying resources is not limited in the disclosure. For two PDU sessions for redundant handling, it is relatively easy to use the MCG bearer as the bearer terminated by the MN and use the SCG bearer as the bearer terminated by the SN.

Here, the NG-RAN node 1 may directly set up the second PDU session on the secondary base station (for example, an NG-RAN node 2) or may firstly set up the second PDU session at the NG-RAN node 1, and then perform an SN addition procedure to hand over the second PDU session to the secondary base station only after the UE is completely configured and a response is made to a core network. For the latter method in which the second PDU session is firstly set up at the NG-RAN node 1, steps 309a, 309b and 310b are not required to be performed.

In step 309a, if the NG-RAN node 1 decides to set up the second PDU session at the NG-RAN node 2, the NG-RAN node 1 transmits an SN addition request message to the NG-RAN node 2. The message comprises information on redundant PDU session handling. The information on redundant PDU session handling may indicate whether the PDU session is the first PDU session or the second PDU session using the RSN. The information on redundant PDU session handling may also indicate an association relationship between the two PDU sessions for redundant handling, so as to, for example, inform the NG-RAN node 2 of which two PDU sessions are used for redundant handling. The NG-RAN node 2 stores the information on redundant PDU session handling, and the NG-RAN node 2 sets up the PDU session as the bearer terminated by the SN. The NG-RAN node 2 does not hand over the bearer to the bearer terminated by the MN.

In step 309b, the NG-RAN node 2 transmits an SN addition request acknowledgement message to the NG-RAN node 1. The NG-RAN node 2 allocates downlink tunnel information for an NG interface for the PDU session to be set up as the bearer terminated by the SN. The tunnel information comprises a tunnel end number and a transport layer address.

If the NG-RAN node 1 cannot configure dual connectivity (DC) for the UE, for example, according to a measurement report of the UE, the NG-RAN node 1 may not allocate resources to the second PDU session, and in step 311, at the NG-RAN node 1, the PDU session is included in a list of PDU sessions for which resource setup fails. Reasons for the failure are contained in PDU session resource setup failure transfer information, for example, a reason that the second PDU session cannot be set up or the DC configuration is not supported. For the second PDU session which fails to be set up, the SMF does not trigger a second PDU session setup procedure to the NG-RAN. The NG-RAN node 1 may configure the second PDU session in NG-RAN node 1, as described in step 311 for details.

In step 310, the NG-RAN node 1 transmits an RRC connection reconfiguration message to the UE. The NG-RAN node 1 transmits a received NAS message to the UE. The UE transmits an RRC connection reconfiguration completion message to the NG-RAN node 1. Resources are configured for the PDU session to be set up using this step.

In step 310b, the NG-RAN node 1 transmits an SN reconfiguration completion message to the NG-RAN node 2.

Here, there is no absolute order of step 310b and step 311.

In step 311, the NG-RAN node 1 transmits a PDU session setup acknowledgement message to the AMF.

In correspondence to the second method for selecting an UPF, at the NG-RAN node 1, the base station identity of the base station where the PDU session is to be set up or the identity of the cell of the base station accessed by the UE is included in the PDU session resource setup response transfer, for example, if the first PDU session is to be set up at the NG-RAN node 1, the identity of the NG-RAN node 1 or an identity of a cell of the NG-RAN node 1 accessed by the UE is contained in response information of the first PDU session, and if the second PDU session is to be set up at the NG-RAN node 2, the identity of the NG-RAN node 2 or an identity of a cell of the NG-RAN node 2 accessed by the UE is contained in response information of the second PDU session. If the SMF receives the identity of the cell of the base station, the SMF may obtain the base station identity according to the cell identity.

In correspondence to the third method for selecting an UPF, for setup of the second PDU session for redundant PDU processing, if the second PDU session is to be set up on the secondary base station, the message comprises the identity of the secondary base station or an identity of a cell of the secondary base station accessed by the UE, which, in the present embodiment, is the identity of the NG-RAN node 2 or the identity of the cell of the NG-RAN node 2 accessed by the UE. The message comprises information of a downlink tunnel which is allocated by the NG-RAN for the PDU session to be set up.

If the second PDU session fails to be set up at the secondary base station, there are two processing methods in the disclosure.

In a first method, the NG-RAN does not allocate resources comprising radio resources and network resources to the second PDU session, and the second PDU session fails to be set up. At the NG-RAN node 1, the second PDU session is included in a list of PDU sessions for which resource setup fails in a PDU session setup response message. The list of PDU sessions for which resource setup fails comprises identities of the PDU sessions and reasons for the failure, for example, a reason that the dual connectivity fails to be set up or DC configuration is not supported. The SMF decides whether to maintain the first PDU session in the redundant PDU sessions or release the first PDU session in the redundant PDU sessions according to a local policy.

In a second method, the NG-RAN node 1 configures the second PDU session at the NG-RAN node 1, that is, two PDU sessions for redundant handling are not configured as dual connectivity. At the NG-RAN node 1, the second PDU session is included in PDU session resource setup list in a PDU session setup response message, wherein the PDU session resource setup response comprises identities of the PDU sessions. The PDU session resource setup response further comprises information that the two PDU sessions are not configured as dual connectivity or information that the two PDU sessions fail to be configured as dual connectivity or information that the second PDU session fails to be set up at the secondary base station. At the NG-RAN node 1, a base station identity of a base station where the second PDU session is configured or an identity of a primary cell of the base station may be included in the PDU session resource setup response. The SMF is notified implicitly through the base station identity of the base station where the second PDU session is configured or the identity of the primary cell of the base station that the second PDU session is not configured at the secondary base station or the two redundant PDU sessions are not configured in a dual connectivity mode. The SMF knows that the two PDU sessions for redundant handling are not successfully configured as DC according to the received base station identity of the base station where the second PDU session is configured or the received identity of the primary cell of the base station and an identity of a master base station or an identity of a primary cell of the master base station. For the method of implicitly notifying the SMF that the two PDU sessions are not successfully configured as dual connectivity, the NG-RAN node 1 may also transmit a base station identity of a base station where the first PDU session is configured or an identity of a primary cell of the base station (for example, the identity of the NG-RAN node 1) to the SMF. Thereby, the SMF knows that the two PDU sessions for redundant handling are not successfully configured as dual connectivity according to the base station identity of the base station where the first PDU session is configured or the identity of the primary cell of the base station and the base station identity of the base station where the second PDU session is configured or the identity of the primary cell of the base station. The NG-RAN node 1 may transmit the base station identity of the base station where the first PDU session is configured or the identity of the primary cell of the base station to the SMF in a process of setting up the first PDU session, or in the present step. The SMF decides whether to maintain the second PDU session or release the second PDU session according to a local policy. For this method, if the NG-RAN does not receive a message to release the second PDU session, when the NG-RAN node 1 can hand over the second PDU session to the secondary base station, the NG-RAN node 1 performs an secondary node (SN) addition process, to set up the second PDU session at the secondary base station and configure the second PDU session as a bearer terminated by the SN. The NG-RAN node 1 notifies the SMF that the second PDU session is successfully configured at the secondary base station or the dual connectivity is configured successfully, the NG-RAN node 1 may further notify the SMF of the identity of the secondary base station or the identity of the cell of the secondary base station accessed by the UE, and the SMF may determine whether to reselect a UPF for the second PDU session using the identity of the base station or the identity of the cell of the secondary base station. The identity of the cell of the secondary base station may be a cell identity of the primary cell of the secondary base station which is selected for the UE.

In step 312, the AMF transmits an update session management context request message to the SMF. The AMF transmits the identity of the master base station and/or the secondary base station or the identity of the cell of the master base station accessed by the UE and/or the identity of the cell of the secondary base station accessed by the UE which are received from the NG-RAN node 1 to the SMF. The AMF transmits the session management information received from the NG-RAN to the SMF.

In correspondence to the second method for selecting an UPF, if the SMF receives the identity of the base station or the identity of the cell of the base station accessed by the UE, the SMF may reselect UPFs for the first PDU session and/or the second PDU session respectively. The SMF selects the UPFs for the first PDU session and the second PDU session in consideration of the identity of the master base station and the identity of the secondary base station respectively. The SMF may select UPFs which are close to the master base station and the secondary base station respectively. The identities of the base stations are used as an input for UPF reselection. If the SMF receives the identity of the cell of the base station, the SMF may obtain the base station identity according to the cell identity.

In correspondence to the third method for selecting an UPF, if the SMF receives the identity of the secondary base station or the identity of the cell of the secondary base station accessed by the UE, the SMF may reselect an UPF for the second PDU session. The identity of the secondary base station is used as an input for UPF reselection. The SMF selects the UPF which serves the second PDU session in consideration of the identity of the secondary base station. The SMF may select an UPF which is close to the secondary base station. If the SMF receives the identity of the cell of the base station, the SMF may obtain the base station identity according to the cell identity.

The message comprises information of a tunnel allocated by the NG-RAN for the PDU session to be set up.

In step 313, the SMF transmits an N4 session modification request message to the UPF. If the UPF is reselected, the SMF transmits an N4 session modification request message to the reselected UPF. The SMF transmits, to the UPF, information of a downlink tunnel allocated by the NG-RAN for the data transmission over NG interface. For a PDU session which fails to be set up by the NG-RAN, the SMF requests the UPF to delete corresponding downlink user plane tunnel information, and the UPF may delete the PDU session or mark the corresponding PDU session as inactive.

In step 314, the UPF transmits an N4 session modification response message to the SMF.

In step 315, the SMF transmits an update session management context acknowledgement message to the AMF.

So far, the method for supporting reliable session transmission and the first session setup method according to the disclosure have been described. With these methods, two redundant PDU sessions may be set up on two base stations to ensure the reliability of the transmission, and UPFs which are close to the two base stations may be selected respectively to reduce the delay of the transmission.

FIG. 4 schematically illustrates a schematic diagram of a method for handing over a second PDU session to a secondary base station (for example, the NG-RAN node 2 in FIG. 3) according to an embodiment of the disclosure. In correspondence to the setup of the second PDU session in redundancy processing, the method firstly sets up, by the master base station, the second PDU session at the master base station (for example, the NG-RAN node 1 in FIG. 3), and then performs an SN addition procedure to hand over the second PDU session to the secondary base station (for example, the NG-RAN node 2 in FIG. 3) only after the UE is completely configured and a response is made to a core network. The method comprises the following steps where a detailed description of steps unrelated to the disclosure is omitted.

In step 401, an MN transmits an SN addition request message to an SN. The message comprises information on redundant PDU session handling. The information on redundant PDU session handling may indicate whether the PDU session is the first PDU session or the second PDU session using the RSN. The information on redundant PDU session handling may also indicate an association relationship between the two PDU sessions for redundant handling, so as to, for example, inform the SN of which two PDU sessions are used for redundant handling. The SN stores the information on redundant PDU session handling, and the SN sets up the PDU session as a bearer terminated by the SN. The SN does not hand over the bearer to a bearer terminated by the MN.

In step 402, the SN transmits an SN addition request acknowledgement message to the MN. The SN allocates downlink tunnel information for an NG interface for the PDU session to be set up as the bearer terminated by the SN. The tunnel information comprises a tunnel end number and a transport layer address.

If the SN cannot accept the requested configuration, for example, the SN transmits an SN addition request rejection message to the MN due to the limitation on the radio resources or failure in preparation for the SN addition. There are two processing methods in the disclosure.

In a first method, the MN maintains the second PDU session to be configured at the MN. The MN transmits a message to the AMF, wherein the message comprises an identity of the PDU session and information that the dual connectivity fails to be configured. The message may be an existing PDU session resource modification request message or a PDU session resource notification message or a newly defined message. The AMF transmits the identity of the PDU session and the information that the dual connectivity fails to be configured to the SMF. The MN may transmit a base station identity of a base station where the second PDU session is configured or an identity of a primary cell of the base station to the SMF. The SMF is notified implicitly through the base station identity of the base station where the second PDU session is configured or the identity of the primary cell of the base station that the second PDU session is not configured at the secondary base station or the two redundant PDU sessions are not configured in a dual connectivity mode. The SMF knows that the two PDU sessions for redundant handling are not successfully configured as DC according to the received base station identity of the base station where the second PDU session is configured or the received identity of the primary cell of the base station and an identity of a master base station or an identity of a primary cell of the master base station. For the method of implicitly notifying the SMF that the two PDU sessions are not successfully configured as dual connectivity, the MN may also transmit a base station identity of a base station where the first PDU session is configured or an identity of a primary cell of the base station (for example, the identity of the MN) to the SMF. Thereby, the SMF knows that the two PDU sessions for redundant handling are not successfully configured as dual connectivity according to the base station identity of the base station where the first PDU session is configured or the identity of the primary cell of the base station and the base station identity of the base station where the second PDU session is configured or the identity of the primary cell of the base station. The MN may transmit the base station identity of the base station where the first PDU session is configured or the identity of the primary cell of the base station to the SMF in a process of setting up the first PDU session, or in the present step. The SMF decides whether to maintain the second PDU session or release the second PDU session according to a local policy. For this method, if the MN does not receive a message to release the second PDU session, when the MN may hand over the second PDU session to the secondary base station, the MN performs an SN addition process, to set up the second PDU session at the secondary base station and configure the second PDU session as a bearer terminated by the SN. The MN notifies the SMF through the AMF that the second PDU session is successfully configured at the secondary base station or the dual connectivity is configured successfully, the MN may further notify the SMF through the AMF of the identity of the secondary base station or the identity of the cell of the secondary base station accessed by the UE, and the SMF may determine whether to reselect a UPF for the second PDU session using the identity of the secondary base station or the identity of the cell of the secondary base station. The identity of the cell of the secondary base station may be a cell identity of the primary cell of the secondary base station which is selected for the UE.

In a second method, the MN releases the second PDU session. The MN transmits a PDU session resource notification message to the AMF. The PDU session resource release information in the PDU session resource notification message comprises the identity of the PDU session and the reason, for example, a reason that the dual connectivity fails to be set up. The AMF transmits the PDU session information to the SMF. The SMF decides whether to maintain the first PDU session in the redundant PDU sessions or release the first PDU session in the redundant PDU sessions according to a local policy. If the MN receives the SN addition request rejection message transmitted by the SN, there is no need to perform subsequent steps 403 to 412.

In step 403, the MN transmits an RRC connection reconfiguration message to the UE.

In step 404, the UE transmits an RRC connection reconfiguration completion message to the MN.

Resources are configured for the PDU session to be set up using steps 403 and 404.

In step 405, the MN transmits an SN reconfiguration completion message to the SN.

Here, there is no absolute order for step 405 and steps 407, 408 and 409.

In step 406, for the bearer terminated by the SN which uses a radio link control (RLC) acknowledgement mode (AM), the MN transmits a sequence number (SN) state transition message to the SN.

In step 407, for the bearer terminated by the SN which uses the RLC AM, the MN may initiate a data forwarding procedure depending on bearer characteristics of a corresponding QoS flow.

In step 408, for the bearer terminated by the SN, the MN transmits a PDU session modification indication message to the AMF.

The message comprises an identity of the secondary base station or an identity of a cell of the secondary base station accessed by the UE. The identity of the secondary base station or the identity of the cell of the secondary base station accessed by the UE is contained in the PDU session modification indication transfer information. The message comprises information of a downlink tunnel which is allocated by the SN for the PDU session to be set up.

In step 409, the AMF transmits an update session management context request message to the SMF. The AMF transmits the identity of the secondary base station or the identity of the cell of the secondary base station accessed by the UE received from the MN to the SMF.

If the SMF receives the identity of the secondary base station or the identity of the cell of the secondary base station accessed by the UE, the SMF may reselect an UPF for the second PDU session. The identity of the secondary base station is used as an input for UPF reselection. The SMF selects the UPF which serves the second PDU session in consideration of the identity of the secondary base station. The SMF may select an UPF which is close to the secondary base station. If the SMF receives the identity of the cell of the base station, the SMF may obtain the base station identity according to the cell identity.

The message comprises information of a tunnel allocated by the MN for the PDU session to be set up.

In step 410, the SMF transmits an N4 session modification request message to the UPF. If the UPF is reselected, the SMF transmits an N4 session modification request message to the reselected UPF. The SMF transmits, to the UPF, information of a downlink tunnel for the NG interface allocated by the MN for data transmission. The UPF transmits an N4 session modification response message to the SMF.

In step 411, the SMF transmits an update session management context acknowledgement message to the AMF.

In step 412, the SMF transmits a PDU session modification acknowledgement message to the MN.

So far, the method for handing over the second PDU session by the master base station to the secondary base station according to the disclosure has been described. With this method, two redundant PDU sessions may be set up on two base stations to ensure the reliability of the transmission, and UPFs which are close to the two base stations may be selected respectively to reduce the delay of the transmission.

Figure 5:
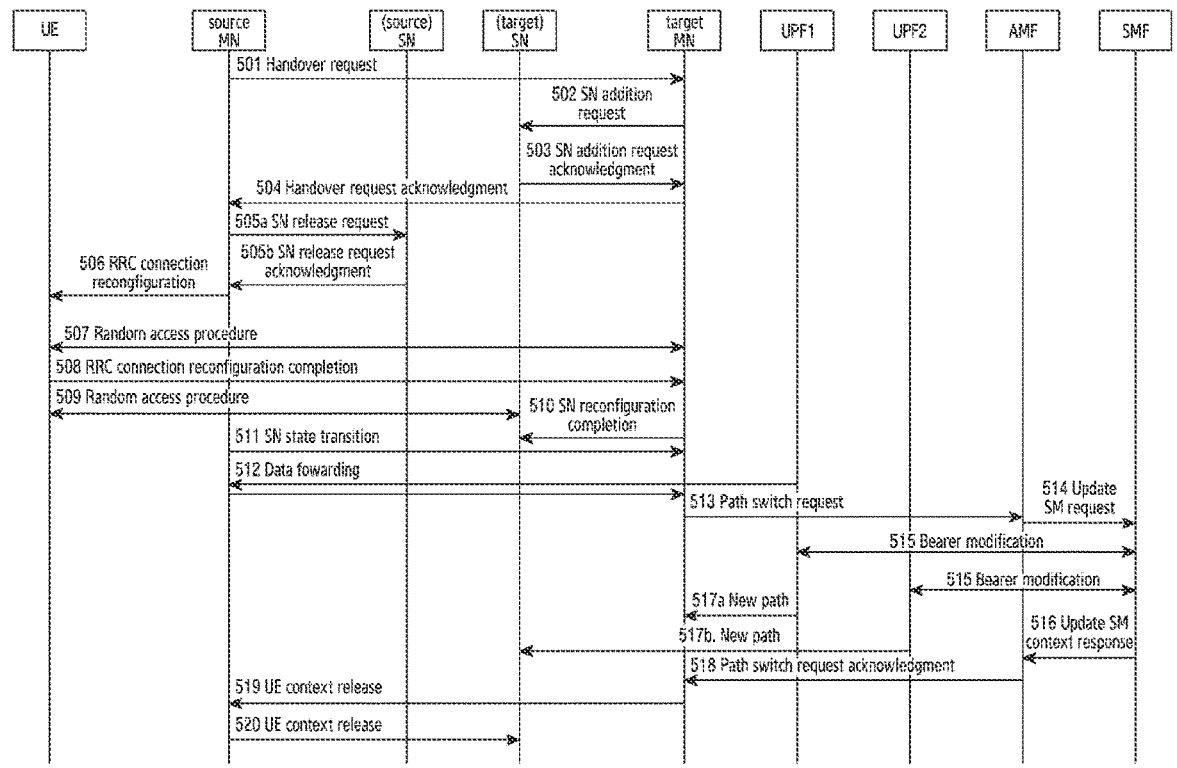
FIG. 5 schematically illustrates a schematic diagram of a method for handing over a PDU session of redundant session processing to another base station according to an embodiment of the disclosure.

FIG. 5 schematically illustrates a schematic diagram of a method for handing over a PDU session of redundant session processing to another base station according to an embodiment of the disclosure. A detailed description of steps unrelated to the disclosure is omitted here. The method comprises the following steps.

In step 501, a source MN transmits a handover request message to a target MN. At the source MN, an UE XnAP identity of the source SN, an identity of the SN and a context of the UE in the source SN are included in the handover request message. The handover request message comprises an MCG configuration and an SCG configuration. The handover request message comprises information on redundant PDU session handling. The information on redundant PDU session handling may indicate whether the PDU session is a first PDU session or a second PDU session using a RSN. The information on redundant PDU session handling may further indicate an association relationship between the two PDU sessions for redundant handling, so as to, for example, inform the target MN of which two PDU sessions are used for redundant handling. The target MN stores the information on redundant PDU session handling. The target MN sets up the two PDU sessions for redundant handling as a bearer terminated by the MN and a bearer terminated by the SN. For example, the MN sets up the first PDU session as the bearer terminated by the MN, and the MN sets up the second PDU session as the bearer terminated by the SN.

The target MN decides whether to reserve the source SN or to select a new target SN.

In step 502, the target MN transmits an SN addition request message to the SN. Depending on a decision made by the target MN of whether to reserve the source SN or select a new target SN, the SN may be the source SN or the target SN. The message comprises information on redundant PDU session handling. The information on redundant PDU session handling may indicate whether the PDU session is the first PDU session or the second PDU session using the RSN. The information on redundant PDU session handling may also indicate an association relationship between the two PDU sessions for redundant handling, so as to, for example, inform the SN of which two PDU sessions are used for redundant handling. The SN stores the information on redundant PDU session handling, and the SN sets up the PDU session as a bearer terminated by the SN. The SN does not hand over the bearer to a bearer terminated by the MN.

In step 503, the SN transmits an SN addition request acknowledgement message to the target MN.

In step 504, the target MN transmits a handover request acknowledgement message to the source MN.

In step 505*a*, the source MN transmits an SN release request message to the source SN. If the source SN receives information indicating reservation of the context of the UE, the source SN reserves the context of the UE.

In step 505*b*, the source SN transmits an SN release request acknowledgement message to the source MN.

In step 506, the source MN transmits an RRC connection reconfiguration message to the UE.

In step 507, the UE is synchronized to the target MN.

In step 508, the UE transmits an RRC connection reconfiguration completion message to the target MN.

In step 509, if the bearer using SCG radio resources is configured, the UE is synchronized to the SN, and if the MN selects a new SN, the SN is the target SN.

In step 510, after the RRC connection reconfiguration succeeds, the target MN transmits an SN reconfiguration completion message to the SN.

In step 511, for a bearer using an RLC AM mode, the source MN transmits an SN state transition message to the target MN.

In step 512, the source MN forwards data to the target MN. If the SN is reserved, the SCG bearer and the SCG split bearer do not require data forwarding.

In step 513, the target MN transmits a path switch request message to the AMF.

At the target MN, a base station identity of a base station where the PDU is to be set up or an identity of a cell of the base station accessed by the UE is included in the path switch request transfer, for example, if the first PDU session is to be set up at the target MN, an identity of the target MN or an identity of a cell of the target MN accessed by the UE is contained in the path switch request transfer information of the first PDU session, and if the second PDU session is to be set up at the target SN or the source SN, an identity of the target SN or an identity of the source SN or an identity of a cell of the target SN accessed by the UE or an identity of a cell of the source SN accessed by the UE is contained in the path switch request transfer information of the second PDU session.

For the setup of the second PDU session for redundant PDU processing, if the second PDU session is to be set up on an secondary base station, the message comprises an identity of the secondary base station or an identity of a cell of the secondary base station accessed by the UE, which is, in the present embodiment, the identity of the target SN or the identity of the source SN or the cell identity of the cell of the target SN accessed by the UE or the cell identity of the cell of the source SN accessed by the UE. The message comprises information of a downlink tunnel which is allocated by a MN for the PDU session to be set up.

The message comprises an identity of the secondary base station or a cell identity of a cell of the secondary base station accessed by the UE. The identity of the secondary base station or the cell identity of the cell of the secondary base station accessed by the UE is contained in the path switch request transfer information. The message comprises information of a downlink tunnel which is allocated by the SN for the PDU session to be set up.

If the two PDU sessions for redundant handling are not configured as dual connectivity at the target base station, the target base station notifies the SMF of this information. The target base station may notify the SMF in an explicit manner of comprising, for example, an information element that the DC is not successfully configured in the path switch request message. The target base station may also notify the SMF in an implicit manner, that is, the target base station notifies the SMF of the base station identity of the base station where each PDU session is set up or the identity of the primary cell of the base station, and the SMF knows whether the DC is successfully configured according to the information, and determines whether to maintain the second PDU session or release the second PDU session according to a local policy.

In step 514, the AMF transmits an update session management context request message to the SMF. The AMF transmits the identity of the base station or the cell identity received from the target MN to the SMF. For each PDU session, if the SMF receives an identity of a base station where the PDU session is to be set up or a cell identity, the SMF selects a UPF for the PDU session using the received identity of the base station. If the SMF receives the identity of the cell of the base station, the SMF may obtain the base station identity according to the cell identity.

If the SMF receives the identity of the secondary base station or the cell identity of the cell of the secondary base station accessed by the UE, the SMF may reselect an UPF for the second PDU session. The identity of the secondary base station is used as an input for UPF reselection. If the SMF receives the identity of the cell of the base station, the SMF may obtain the base station identity according to the cell identity.

The message comprises information of a tunnel allocated by the target MN for the PDU session to be set up.

In step 515, the SMF transmits an N4 session modification request message to the UPF. The SMF transmits an N4 session modification request message to a UPF for the first PDU session and a UPF for the second PDU session for redundant handling respectively. If a UPF is reselected for a certain PDU session, the SMF transmits an N4 session modification request message to the reselected UPF. The SMF transmits, to the corresponding UPF, information of a downlink tunnel for the NG interface allocated by the target MN for data transmission.

The UPF which receives the N4 session modification request message transmits an N4 session modification response message to the SMF.

In step 516, the SMF transmits an update session management context acknowledgement message to the AMF.

In step 517, the UPF transmits data to the target MN. The UPF transmits downlink data to the target MN according to the received information of the downlink tunnel allocated by the target MN. For the bearer terminated by the MN, the corresponding UPF (for example, UPF1) transmits downlink data to the target MN. For the bearer terminated by the SN, the corresponding UPF (for example, UPF2) transmits downlink data to the source SN or the target SN (depending on whether the SN changes).

In step 518, the SMF transmits a path switch request acknowledgement message to the target MN.

In step 519, the target MN transmits a UE context release message to the source MN.

In step 520, the source MN transmits the UE context release message to the source SN.

So far, the method supporting reliable session transmission and the first handover method according to the disclosure have been described. With these methods, two redundant PDU sessions may be set up on two base stations after the handover to ensure the reliability of the transmission, and UPFs which are close to the two base stations may be selected respectively to reduce the delay of the transmission.

Figure 6:
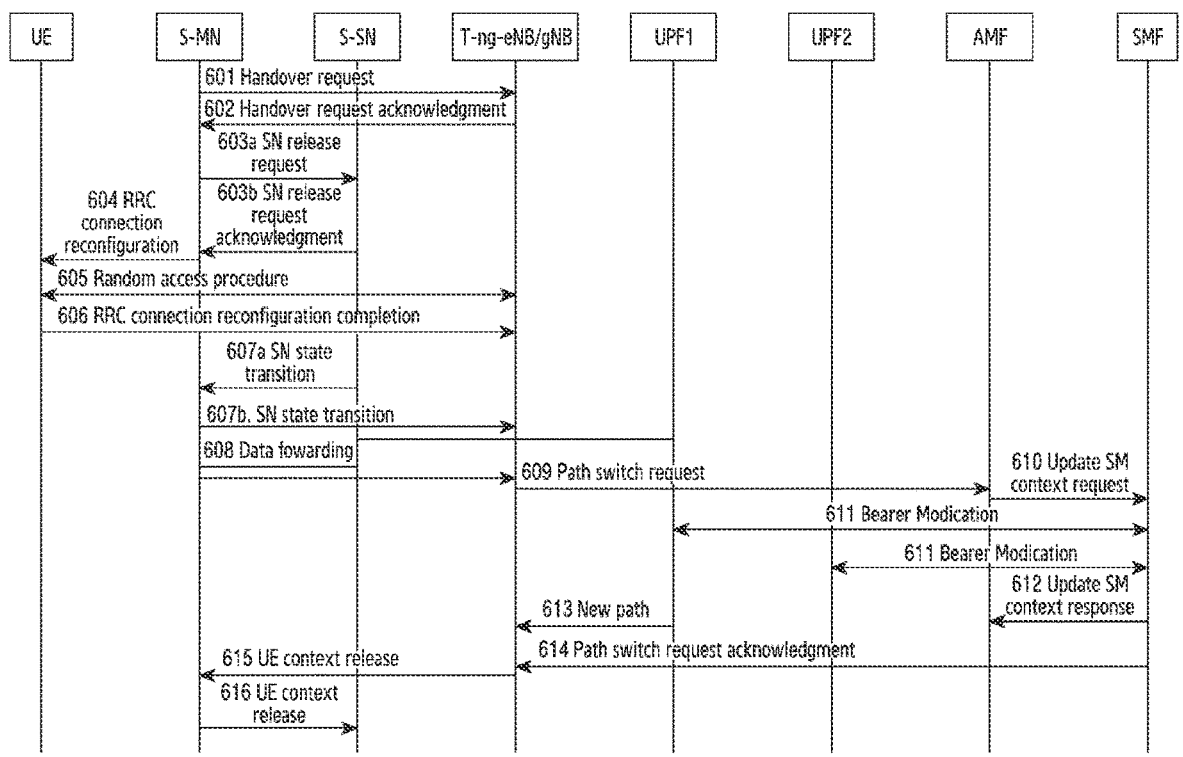
FIG. 6 schematically illustrates a schematic diagram of another method for handing over a PDU session of redundant session processing to another base station according to an embodiment of the disclosure.

FIG. 6 schematically illustrates a schematic diagram of another method for handing over a PDU session of redundant session processing to another base station according to an embodiment of the disclosure. A detailed description of steps unrelated to the disclosure is omitted here. As shown in FIG. 6, the method comprises the following steps.

In step 601, a source MN transmits a handover request message to a target base station. The target base station here is a gNB or an LTE base station gn-eNB connected to a 5G core network.

At the source MN, an UE XnAP identity of the source SN, an identity of the SN and a context of the UE in the source SN are included in the handover request message. The handover request message comprises an MCG configuration and an SCG configuration. The handover request message comprises information on redundant PDU session handling. The information on redundant PDU session handling may indicate whether the PDU session is a first PDU session or a second PDU session using a RSN. The information on redundant PDU session handling may further indicate an association relationship between the two PDU sessions for redundant handling, so as to, for example, inform the target base station of which two PDU sessions are used for redundant handling. The target base station stores the information on redundant PDU session handling.

If the target base station cannot configure dual connectivity, for example, there is no secondary base station cell available according to a measurement report of the UE, there are two processing methods performed by the target base station.

In a first method, the target base station needs not to allocate resources comprising radio resources and network resources to the second PDU session, and the second PDU session fails to be set up. The target base station only configures resources to the first PDU session.

In a second method, the target base station configures both the first PDU session and the second PDU session at the target base station, that is, the two PDU sessions for redundant handling are not configured as dual connectivity.

In step 602, the target base station transmits a handover request acknowledgement message to the source MN. In correspondence to the first processing method at the target base station in step 601, at the target base station, the second PDU session is included in a list of PDU sessions for which resources are not acknowledged. Reasons for the failure are contained in the message, for example, a reason that the second PDU session cannot be set up or DC configuration is not supported. In correspondence to the second processing method at the target base station in step 601, at the target base station, the first PDU session and the second PDU session are included in a list of PDU sessions for which resources are acknowledged.

In step 603a, the source MN transmits an SN release request message to the source SN.

In step 603b, the source SN transmits an SN release request acknowledgement message to the source MN.

In step 604, the source MN transmits an RRC connection reconfiguration message to the UE.

In step 605, the UE is synchronized to the target base station.

In step 606, the UE transmits an RRC connection reconfiguration completion message to the target base station.

In step 607, for a bearer terminated by an SCG which uses an RLC AM mode, the source SN transmits an SN state transition message to the source MN.

In step 607b, the source MN forwards the SN state transition message to the target base station.

In step 608, the source SN forwards data to the source MN. The source MN forwards the data to the target base station.

In step 609, the target base station transmits a path switch request message to the AMF.

At the target base station, a base station identity of a base station where the PDU is to be set up or a cell identity of a cell of the base station accessed by the UE is included in the path switch request transfer, for example, if the first PDU session is to be set up at the target base station, an identity of the target base station or a cell identity of a cell of the target base station accessed by the UE is contained in the path switch request transfer information of the first PDU session.

In correspondence to the first processing method at the target base station in step 601, at the target base station, a second PDU session which fails to be configured at the secondary base station is included in a list of PDU sessions for which resource setup fails. The list of PDU sessions for which resource setup fails comprises identities of the PDU sessions and reasons for the failure, for example, a reason that the second PDU session cannot be set up or DC configuration is not supported. The SMF decides whether to maintain the first PDU session in the redundant PDU sessions or release the first PDU session in the redundant PDU sessions according to a local policy.

In correspondence to the second processing method at the target base station in step 601, at the target base station, the second PDU session is included in a list of resource information on PDU sessions to be handed over in the path switch request message. The resource information on PDU sessions to be handed over comprises identities of the PDU sessions. The resource information on PDU sessions to be handed over further comprises information that the two PDU sessions are not configured as dual connectivity or information that the two PDU sessions fail to be configured as dual connectivity or information that the second PDU session fails to be set up at the secondary base station. The target base station may transmit a base station identity of a base station where the second PDU session is configured or an identity of a primary cell of the base station to the SMF. The SMF is notified implicitly through the base station identity of the base station where the second PDU session is configured or the identity of the primary cell of the base station that the second PDU session is not configured at the secondary base station or the two redundant PDU sessions are not configured in a dual connectivity mode. The SMF knows that the two PDU sessions for redundant handling are not successfully configured as DC according to the received base station identity of the base station where the second PDU session is configured or the received identity of the primary cell of the base station and an identity of a master base station or an identity of a primary cell of the master base station. For the method of implicitly notifying the SMF that the two PDU sessions are not successfully configured as dual connectivity, the target base station may also transmit a base station identity of a base station where the first PDU session is configured or an identity of a primary cell of the base station (for example, the identity of the target base station) to the SMF. Thereby, the SMF knows that the two PDU sessions for redundant handling are not successfully configured as dual connectivity according to the base station identity of the base station where the first PDU session is configured or the identity of the primary cell of the base station and the base station identity of the base station where the second PDU session is configured or the identity of the primary cell of the base station. The SMF decides whether to maintain the second PDU session or release the second PDU session according to a local policy. For this method, if the target base station does not receive a message to release the second PDU session, when the target base station may hand over the second PDU session to the secondary base station, the target base station performs an secondary node (SN) addition process, to set up the second PDU session at the secondary base station and configure the second PDU session as a bearer terminated by the SN. The target base station notifies the SMF that the second PDU session is successfully configured at the secondary base station or the dual connectivity is configured successfully, the target base station may further notify the SMF of the identity of the secondary base station or the identity of the cell of the secondary base station accessed by the UE, and the SMF may determine whether to reselect a UPF for the second PDU session using the identity of the base station or the identity of the cell of the secondary base station. The identity of the cell of the secondary base station may be a cell identity of the primary cell of the secondary base station which is selected for the UE. In fact, the target base station to which the session is successfully handed over is a base station serving the UE, and for convenience of description of the method, the name of the target base station is still used.

In step 610, the AMF transmits an update session management context request message to the SMF. The AMF transmits the identity of the base station or the cell identity received from the target base station to the SMF. The SMF transmits the session management information received from the NG-RAN to the SMF. For each PDU session, if the SMF receives an identity of a base station where the PDU session is to be set up or a cell identity, the SMF selects a UPF for the PDU session using the received identity of the base station. If the SMF receives the identity of the cell of the base station, the SMF may obtain the base station identity according to the cell identity.

The message comprises information of a tunnel allocated by the target base station for the PDU session to be set up.

For the second PDU session which fails to be set up, the SMF does not trigger a second PDU session setup procedure to the target base station.

In step 611, the SMF transmits an N4 session modification request message to the UPF. The SMF transmits an N4 session modification request message to a UPF (for example, UPF1) for the first PDU session and a UPF (for example, UPF2) for the second PDU session for redundant handling respectively. If a UPF is reselected for a certain PDU session, the SMF transmits an N4 session modification request message to the reselected UPF. The SMF transmits, to the corresponding UPF, information of a downlink tunnel for the NG interface allocated by the target base station for data transmission. For a PDU session which fails to be set up by the target base station, the SMF requests the UPF to delete corresponding downlink user plane tunnel information, and the UPF may delete the PDU session or mark the corresponding PDU session as inactive.

The UPF which receives the N4 session modification request message transmits an N4 session modification response message to the SMF.

In step 612, the SMF transmits an update session management context acknowledgement message to the AMF.

In step 613, the UPF transmits data to the target base station. The UPF transmits downlink data to the target base station according to the received information of the downlink tunnel allocated by the target base station.

In step 614, the SMF transmits a path switch request acknowledgement message to the target base station.

In step 615, the target base station transmits a UE context release message to the source MN.

In step 616, the source MN transmits the UE context release message to the source SN.

So far, the method supporting reliable session transmission and the second handover method according to the disclosure have been described. With these methods, no resources are allocated to the second PDU session in a case that DC cannot be configured by the target base station during handing over, which avoids a waste of resources and failure in redundant user plane configuration.

Figure 7:
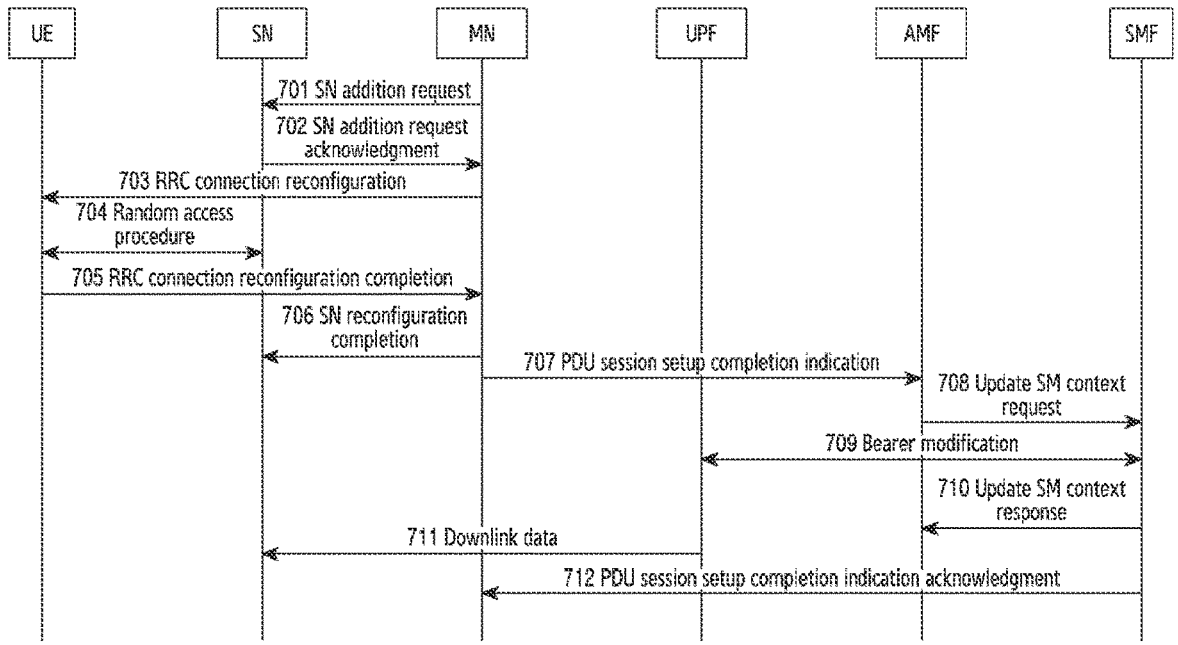
FIG. 7 schematically illustrates a schematic diagram of another session setup method according to an embodiment of the disclosure.

FIG. 7 schematically illustrates a schematic diagram of another session setup method according to an embodiment of the disclosure. In the method of FIG. 3, if the NG-RAN receives information that a second PDU session is to be set up from a core network, but the NG-RAN cannot configure DC for a UE, or a target base station receives information that a redundant user plane is to be set up during handover corresponding to FIG. 6, but the target base station cannot configure the DC for the UE, the base station or the target base station stores the information that the second PDU session needs to be set up, and when the base station can configure the DC for the UE, the base station configures the second PDU session at the secondary base station. A detailed description of steps unrelated to the disclosure is omitted here. As shown in FIG. 7, the method comprises the following steps.

In step 701, an MN transmits an SN addition request message to an SN. The message comprises information on redundant PDU session handling. The information on redundant PDU session handling may indicate whether the PDU session is a first PDU session or a second PDU session using a RSN. The information on redundant PDU session handling may further indicate an association relationship between the two PDU sessions for redundant handling, so as to, for example, inform the SN of which two PDU sessions are used for redundant handling. The SN stores the information on redundant PDU session handling, and the SN sets up the PDU session as a bearer terminated by the SN. The SN does not hand over the bearer to a bearer terminated by the MN.

In step 702, the SN transmits an SN addition request acknowledgement message to the MN.

In step 703, the MN transmits an RRC connection reconfiguration message to the UE.

In step 704, if a bearer using SCG radio resources is configured, the UE is synchronized to the SN.

In step 705, the UE transmits an RRC connection reconfiguration completion message to the MN.

In step 706, after the RRC connection reconfiguration succeeds, the MN transmits an SN reconfiguration completion message to the SN.

In step 707, the MN transmits a PDU session setup completion indication message to the AMF. At the MN, a PDU session identity of the second PDU session and information of a downlink tunnel allocated by the SN are included in the PDU session setup completion indication message. At the MN, a base station identity of a base station where the PDU is to be set up or a cell identity of a cell accessed by the UE is included in the PDU session setup completion indication message. For example, if the second PDU session is to be set up at the SN, an identity of the SN or a cell identity of a primary cell allocated at the SN to the UE is contained in the PDU session setup completion indication message corresponding to the second PDU session.

In step 708, the AMF transmits an update session management context request message to the SMF. The AMF transmits the identity of the base station or the cell identity received from the MN to the SMF. The AMF transmits the received session management information to the SMF. For each PDU session, if the SMF receives an identity of a base station where the PDU session is to be set up or the cell identity, the SMF selects a UPF for the PDU session using the received identity of the base station. If the SMF receives the identity of the cell of the base station, the SMF may obtain the base station identity according to the cell identity.

If the SMF receives an identity of the secondary base station or an identity of a primary cell of the secondary base station, the SMF may selects or reselects a UPF for the second PDU session. The identity of the secondary base station is used as an input for UPF selection or reselection. If the SMF receives the identity of the cell of the base station, the SMF may obtain the base station identity according to the cell identity.

The message comprises information of a tunnel allocated by the MN for the PDU session to be set up.

In step 709, the SMF transmits an N4 session modification request message to the UPF. The SMF transmits an N4 session modification request message to a UPF for the second PDU session for redundant handling. If a UPF is reselected for a certain PDU session, the SMF transmits an N4 session modification request message to the reselected UPF. The SMF transmits, to the corresponding UPF, information of a downlink tunnel for the NG interface allocated by the MN for data transmission.

The UPF which receives the N4 session modification request message transmits an N4 session modification response message to the SMF.

In step 710, the SMF transmits an update session management context acknowledgement message to the AMF.

In step 711, the UPF transmits downlink data to the NG-RAN. The UPF transmits the downlink data to the NG-RAN according to the received information of the downlink tunnel allocated by the NG-RAN. For a bearer terminated by the SN, the corresponding UPF transmits the downlink data to the SN.

In step 712, the SMF transmits a PDU session setup completion indication acknowledgement message to the target MN.

So far, the method supporting reliable session transmission and the second PDU session setup method according to the disclosure have been described. With these methods, during an initial PDU session setup or handover, if the MN cannot configure a redundant PDU session at a certain secondary base station, the MN stores the information of the second PDU session; when the DC becomes available, the MN configures the DC, notifies the information that the second PDU session is to be set up to the SMF (through the AMF), and also notifies the identity of the secondary base station or the identity of the primary cell of the secondary base station to the SMF; and the SMF selects the UPF for the second PDU session in consideration of the identity of the secondary base station or the identity of the primary cell of the secondary base station, which ensures the reliability of transmission and reduces the delay of the transmission.

Figure 8:
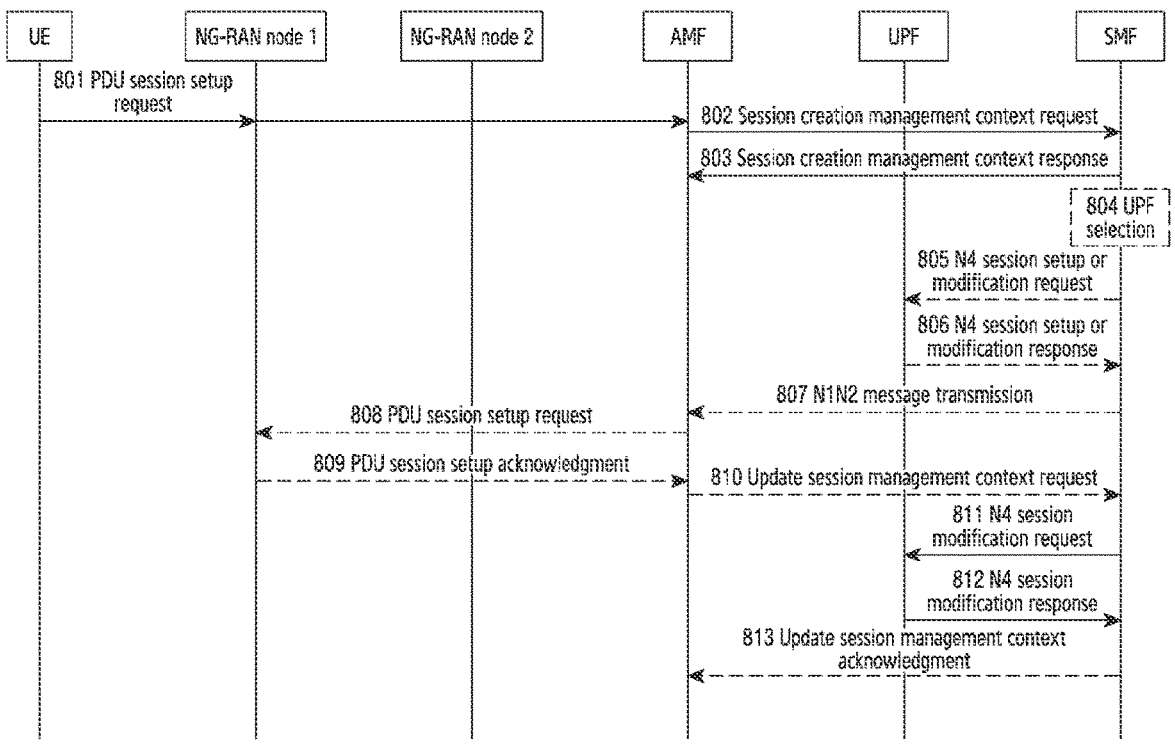
FIG. 8 schematically illustrates a schematic diagram of yet another session setup method according to an embodiment of the disclosure.

FIG. 8 schematically illustrates a schematic diagram of another session setup method according to an embodiment of the disclosure. Detailed description of the steps unrelated to the disclosure is omitted here. As shown in FIG. 8, the method comprises the following steps.

In step 801, a UE transmits a PDU session setup request message to an AMF. The UE transmits the PDU session setup request message to a base station through an RRC message. The RRC message comprises information indicating a redundant PDU session is to be set up or information indicating a second PDU session is to be set up.

The base station (for example, the NG-RAN node 1) accessed by the UE knows that the second PDU session is to be set up, but the base station finds that DC cannot be configured for the UE, for example, according to a measurement report of the UE. In this case, at the base station, information that the DC is unavailable or information that the second PDU session cannot be set up at present is included in an NGAP message for transmitting the non-access stratum message PDU session setup request message, and transmits the NGAP message to the AMF.

If the base station may configure a DC for the UE, for example, according to the measurement report of the UE, at the base station, an identity of an secondary base station where the PDU session may be set up or an identity of a cell of the secondary base station is included in the NGAP message for transmitting the non-access stratum message PDU session setup request message. The AMF transmits the identity of the possible secondary base station or the identity of the cell of the secondary base station to the SMF in step 802. The SMF selects a UPF for the second PDU session service in consideration of the identity of the secondary base station or the identity of the cell of the secondary base station. For example, in step 804, the UPF is selected in consideration of the identity of the secondary base station which may be configured for the UE. If the SMF receives the identity of the cell of the base station, the SMF may obtain the base station identity according to the cell identity.

The base station transmits the PDU session setup request message to the AMF through the NGAP message.

The PDU session setup request message comprises a redundant sequence number (RSN). The RSN indicates redundant handling. A value of the RSN indicates whether a first PDU session or a second PDU session is to be set up.

In step 802, the AMF transmits a session creation management context request message to an SMF. If the AMF receives the information indicating the DC is unavailable or the information indicating a second PDU session cannot be set up at present from the NG-RAN, the AMF transmits information indicating the DC is unavailable or the information indicating a second PDU session cannot be set up at present to the SMF. The SMF stores information of the second PDU session to be set up.

In step 803, the SMF transmits a session creation management context response message to the AMF.

In the method according to the disclosure, the SMF may trigger steps 804 to 813. As another method of the disclosure, steps 804 to 813 may not be triggered.

In step 804, the SMF selects an UPF. The SMF selects the UPF in consideration of the base station identity or the cell identity received from the AMF. The SMF knows that the PDU session is used for redundant handling based on the RSN received from the UE or based on a data network name (DNN) or single network slice selection assistance information (S-NSSAI) and network configuration and knows whether the PDU session is the first PDU session or the second PDU session. The SMF selects the UPF using the information that the first PDU session or the second PDU session is to be set up in combination with other information.

In 805, the SMF transmits an N4 session setup request message or N4 session modification request message to the selected UPF. If the request is an initial request, the SMF initiates an N4 session setup procedure to the selected UPF; otherwise, the SMF initiates an N4 session modification procedure to the selected UPF.

In step 806, the UPF transmits an N4 session setup response or an N4 session modification response message to the SMF.

In step 807, the SMF transmits an N1N2 message transmission message to the AMF. The message comprises a PDU session identity, N2 session management (SM) information, and an N1 session container.

In step 808, the AMF transmits a PDU session setup request message to the NG-RAN node 1. The message comprises information on redundant PDU session handling. The information on redundant PDU session handling may indicate whether the PDU session is the first PDU session or the second PDU session using the RSN. The information on redundant PDU session handling may also indicate an association relationship between the two PDU sessions for redundant handling, so as to, for example, inform the NG-RAN node 1 of which two PDU sessions are used for redundant handling.

The NG-RAN node 1 knows, according to the received PDU session setup request message, that the PDU session to be set up is used for redundant handling. The NG-RAN node 1 also knows whether the PDU session to be set up is the first PDU session or the second PDU session, or the NG-RAN node 1 may also know which two PDU sessions are used for redundant handling. If the PDU session to be set up is used for redundant handling and the PDU session to be set up is the second PDU session, but the NG-RAN node 1 cannot configure the DC for the UE, the NG-RAN node 1 stores the information of the second PDU session to be set up.

If the NG-RAN node 1 cannot configure dual connectivity (DC) for the UE, for example, according to a measurement report of the UE, there are two processing methods performed at the NG-RAN node 1, and details thereof are the same as those in step 311, and will not be described here again.

In step 809, the NG-RAN node 1 transmits a PDU session setup acknowledgement message to the AMF.

In step 810, the AMF transmits an update session management context request message to the SMF.

In step 811, the SMF transmits an N4 session modification request message to the UPF. For a PDU session which fails to be set up by the NG-RAN, the SMF requests the UPF to delete corresponding downlink user plane tunnel information, and the UPF may delete the PDU session or mark the corresponding PDU session as inactive.

In step 812, the UPF transmits an N4 session modification response message to the SMF.

In step 813, the SMF transmits an update session management context acknowledgement message to the AMF.

The NG-RAN node 1 monitors information of whether the DC is available, and when the DC becomes available, the NG-RAN configures the DC, and the process described in FIG. 7 is performed.

A system supporting reliable session transmission according to the disclosure is shown in FIG. 9. A redundant user plane is set up for a UE, two UPFs are connected to two different centralized unit-user plane entities (CU-UPs) of the same base station respectively, and the two CU-UPs transmit data of two PDU sessions to the UE through respective DUs connected thereto respectively. Compared with the related art, instead of transmitting data of two redundant PDU sessions to the UE through two base stations, the data of the two redundant PDU sessions is transmitted to the UE through two CU-UPs and two DUs of the same base station.

FIG. 10 illustrates a schematic flowchart of a session setup method according to an embodiment of the disclosure. As shown in FIG. 10, the method comprises the following steps.

In step S1010, a message for creating a session management context is received.

In some examples, the message may be a session creation management context request message received from an AMF, but the technical solutions according to the embodiments of the disclosure are not limited to a specific message/a specific name of a message.

In step S1020, an UPF for redundant session processing is selected in response to the message for creating a session management context.

In step S1030, a packet data unit (PDU) session corresponding to the UPF is set up.

In some embodiments, selecting an UPF for redundant session processing in response to the message for creating a session management context may comprise:
  determining that a session for which the session management context needs to be created is a redundant session and whether the redundant session is a first redundant session or a second redundant session based on at least one of:
  information related to the redundant session contained in the message for creating a session management context (for example, a PDU session setup request message); and
  a data network name (DNN) or single network slice selection assistance Information (S-NSSAI) and an operator's network configuration; and
  selecting, based on the determination, the UPF for redundant session processing according to an identity of a serving base station of a user equipment (UE).

For example, for a first redundant session and a second redundant session, UPFs are selected according to an identity of a master base station (for example, the serving base station of the UE). Of course, other implementations are also possible, and the embodiments of the disclosure are not limited thereto.

For example, the selection of the UPFs may also be implemented at other times. In some embodiments, after the UPFs are selected for the first redundant session and the second redundant session, reselection may also be performed at a later appropriate time. Based thereon, the method may further comprise:
  receiving a first base station identity of a base station where the first redundant session is to be set up or a cell identity of a cell of the first base station accessed by the UE and a second base station identity of a base station where the second redundant session is to be set up or a cell identity of a cell of the second base station accessed by the UE, selecting an UPF for the first redundant session according to the first base station identity, and selecting an UPF for the second redundant session according to the second base station identity. If the SMF receives the identity of the cell of the base station, the SMF may obtain the base station identity according to the cell identity. Alternatively, the method may further comprise: receiving a base station identity of a base station where the second redundant session is to be set up, and selecting an UPF for the second redundant session according to the base station identity or the cell identity. Here, according to selection criteria, a UPF which is as close as possible to a base station where a session is to be set up is selected. The UPF may also be selected according to other distance related conditions or a combination of distance related conditions and other selection criteria.

FIG. 11 illustrates a schematic flowchart of another session setup method according to an embodiment of the disclosure. The method is performed at a first base station (for example, a master base station/serving base station of a UE), which sets up a first redundant session for redundant handling. As shown in FIG. 11, the method comprises the following steps.

In step S1110, a message for setting up a second redundant session for redundant handling is received.

The message may be a PDU session setup request message received from an AMF, but the technical solutions according to the embodiments of the disclosure are not limited to a specific message/a specific name of a message.

In step S1120, it is determined, in response to the message, whether to add a second base station for processing the second redundant session.

In step S1130, the second redundant session is configured to be processed by the second base station if it is determined to add the second base station.

In some embodiments, determining, in response to the message, whether to add a second base station for processing the second redundant session may comprise:
  determining whether the first base station supports dual connectivity for the first redundant session and the second redundant session; and
  if the first base station supports the dual connectivity, determining to add the second base station to configure the second redundant session to be processed by the second base station; otherwise, determining not to add the second base station.

The first base station may store information required to set up the second redundant session in a case that the first base station does not support the dual connectivity; and when it is determined that the first base station is capable of supporting the dual connectivity, determine to add the second base station using the stored information to configure the second redundant session to be processed by the second base station.

In the above embodiments, configuring the second redundant session to be processed by the second base station may comprise:
 requesting the second base station to set up the second redundant session on the second base station;
 receiving, from the second base station, an acknowledgement message accepting setup of the second redundant session;
 receiving resources configured by a user equipment for the second redundant session; and
 transmitting the configured resources to the second base station to set up the second redundant session on the second base station.

Alternatively, configuring the second redundant session to be processed by the second base station may comprise:
 setting up the second redundant session on the first base station;
 requesting the second base station to set up the second redundant session on the second base station;
 receiving, from the second base station, an acknowledgement message accepting setup of the second redundant session;
 receiving resources configured by the user equipment for the second redundant session; and
 handing over the second redundant session to the second base station using the configured resources.

FIG. 12 illustrates a schematic block diagram of an SMF for session setup according to an embodiment of the disclosure. As shown in FIG. 12, the SMF comprises a message receiving unit 1210, an UPF selection unit 1220, and a session setup unit 1230. The message receiving unit 1210 is configured to receive a message for creating a session management context. The UPF selection unit 1220 is configured to select an UPF for redundant session processing in response to the message for creating a session management context. The session setup unit 1230 is configured to set up a packet data unit (PDU) session corresponding to the UPF.

In some examples, the received message may be a session creation management context request message received from an AMF, but the technical solutions according to the embodiments of the disclosure are not limited to a specific message/a specific name of a message.

In some examples, the UPF selection unit 1220 may be configured to:
 determine that a session for which the session management context needs to be created is a redundant session and whether the redundant session is a first redundant session or a second redundant session based on at least one of:
 information related to the redundant session contained in the message for creating a session management context (for example, a PDU session setup request message); and
 a data network name (DNN) or single network slice selection assistance information (S-NSSAI) and an operator's network configuration; and
 select, based on the determination, the UPF for redundant session processing according to an identity of a serving base station of a user equipment (UE) or a cell identity of a cell of the base station accessed by the UE.

For example, for a first redundant session and a second redundant session, UPFs are selected according to an identity of a master base station (for example, the serving base station of the UE). Of course, other implementations are also possible, and the embodiments of the disclosure are not limited thereto.

For example, the selection of the UPFs may also be implemented at other times. In some embodiments, after the UPFs are selected for the first redundant session and the second redundant session, reselection may also be performed at a later appropriate time. Based thereon, the UPF selection unit 1220 may further be configured to: receive a first base station identity of a base station where the first redundant session is to be set up or a cell identity of a cell of the first base station accessed by the UE and a second base station identity of a base station where the second redundant session is to be set up or a cell identity of a cell of the second base station accessed by the UE, select an UPF for the first redundant session according to the first base station identity, and select an UPF for the second redundant session according to the second base station identity. If the SMF receives the identity of the cell of the base station, the SMF may obtain the base station identity according to the cell identity. Alternatively, the UPF selection unit 1220 may further be configured to: receive a base station identity of a base station where the second redundant session is to be set up, and select an UPF for the second redundant session according to the base station identity or the cell base station. Here, according to selection criteria, a UPF which is as close as possible to a base station where a session is to be set up is selected. If the SMF receives the identity of the cell of the base station, the SMF may obtain the base station identity according to the cell identity. The UPF may also be selected according to other distance related conditions or a combination of distance related conditions and other selection criteria.

FIG. 13 illustrates a schematic block diagram of a base station for session setup according to an embodiment of the disclosure. As shown in FIG. 13, the base station comprises a message receiving unit 1310, a base station addition determination unit 1320, and a second redundant session configuration unit 1330. The message receiving unit 1310 is configured to receive a message for setting up a second redundant session for redundant handling. The base station addition determination unit 1320 is configured to determine, in response to the message, whether to add a second base station for processing the second redundant session. The second redundant session configuration unit 1330 is configured to configure the second redundant session to be processed by the second base station if it is determined to add the second base station.

The message may be a PDU session setup request message received from an AMF, but the technical solutions according to the embodiments of the disclosure are not limited to a specific message/a specific name of a message.

In some embodiments, the base station addition determination unit 1320 may be configured to:
 determine whether the first base station supports dual connectivity for the first redundant session and the second redundant session; and
 if the first base station supports the dual connectivity, determine to add the second base station to configure the second redundant session to be processed by the second base station; otherwise, determine not to add the second base station.

The first base station may store information required to set up the second redundant session in a case that the first base station does not support the dual connectivity; and when it is determined that the first base station is capable of supporting the dual connectivity, determine to add the second base station using the stored information to configure the second redundant session to be processed by the second base station.

In the above embodiments, the second redundant session configuration unit 1330 may be configured to:
- request the second base station to set up the second redundant session on the second base station;
- receive, from the second base station, an acknowledgement message accepting setup of the second redundant session;
- receive resources configured by a user equipment for the second redundant session; and
- transmit the configured resources to the second base station to set up the second redundant session on the second base station.

Alternatively, the second redundant session configuration unit 1330 may be configured to:
- set up the second redundant session on the first base station;
- request the second base station to set up the second redundant session on the second base station;
- receive, from the second base station, an acknowledgement message accepting setup of the second redundant session;
- receive resources configured by the user equipment for the second redundant session; and
- hand over the second redundant session to the second base station using the configured resources.

In the above embodiments, the first base station acts as a master base station for redundant session processing. In some embodiments, a main control function may be handed over from another base station (for example, a third base station below) which acts as a master base station for some other redundant session processing. FIG. 14 illustrates a schematic flowchart of a method for handing over a master base station for redundant session processing according to an embodiment of the disclosure. As shown in FIG. 14, the method comprises the following steps.

In step S1410, a handover request message transmitted by the third base station is received, wherein the handover request message requests to hand over a main control function for redundant session processing of the third base station to the first base station.

In step S1420, a connection to a user equipment (UE) corresponding to the redundant session processing is set up based on the handover request message.

In step S1430, a path switch request message is transmitted to a mobility management control entity.

In some embodiments, the method may further comprise: in response to the handover request message, adding a fourth base station for processing a second redundant session in redundant sessions of the third base station.

In some embodiments, the first base station may also hand over its main control function for redundant session processing to another base station. In this case, the first base station may transmit a handover request message to the other base station, and release resources after receiving an acknowledgement message from the other base station.

FIG. 15 illustrates a schematic block diagram of a device for handing over a master base station for redundant session processing according to an embodiment of the disclosure. The device may be the first base station described above. As shown in FIG. 15, the device comprises a message receiving unit 1510, a connection setup unit 1520 and a message transmitting unit 1530. The message receiving unit 1510 is configured to receive a handover request message transmitted by a third base station, wherein the handover request message requests to hand over a main control function for redundant session processing of the third base station to a first base station. The connection setup unit 1520 is configured to set up a connection to a user equipment (UE) corresponding to the redundant session processing based on the handover request message. The message transmitting unit 1530 is configured to transmit a path switch request message to a mobility management control entity.

In some embodiments, the device may further comprise a base station addition unit 1540 configured to, in response to the handover request message, add a fourth base station for processing a second redundant session in redundant sessions of the third base station.

In some embodiments, the first base station may also hand over its main control function for redundant session processing to another base station. In this case, the first base station may transmit a handover request message to the other base station, and release resources after receiving an acknowledgement message from the other base station.

FIG. 16 schematically illustrates a block diagram of a computing system which may be used to implement the SMF 1200 or the base station 1300 of the disclosure, according to an embodiment of the disclosure.

As shown in FIG. 16, the computing system 1600 comprises a processor 1610, a computer readable storage medium 1620, an output interface 1630, and an input interface 1640. The computing system 1600 may perform the method described above with reference to FIG. 10, 11 or 14.

Specifically, the processor 1610 may comprise, for example, a general purpose microprocessor, an instruction set processor, and/or a related chipset and/or a dedicated microprocessor (for example, an application specific integrated circuit (ASIC for short)), etc. The processor 1610 may further comprise an onboard memory for caching purposes. The processor 1610 may be a single processing unit or a plurality of processing units for performing different actions of the method flow described with reference to FIG. 10, 11 or 14.

The computer readable storage medium 1620 may be, for example, any medium which may contain, store, communicate, propagate or transmit instructions. For example, the readable storage medium may comprise, but is not limited to, an electronic, magnetic, optical, electromagnetic, infrared, or semiconductor system, apparatus, device, or propagation medium. Specific examples of the readable storage medium comprise: a magnetic storage apparatus such as a hard disk drive (HDD for short); an optical storage apparatus such as a compact disk read only memory (CD-ROM for short); a memory such as a random access memory (RAM for short) or a flash memory; and/or a wired/wireless communication link.

The computer readable storage medium 1620 may comprise a computer program 1621 which may comprise code/computer executable instructions that, when executed by the processor 1610, cause the processor 1610 to perform, for example, the method flow as described above with reference to FIG. 10, 11 or 14. and any variations thereof.

The computer program 1621 may be configured to have computer program codes comprising, for example, computer program modules. For example, in an exemplary embodiment, the codes in the computer program 1621 may comprise one or more program modules comprising, for example, a module 1621A, a module 1621B, . . . . It should be illustrated that a division manner and a number of modules are not fixed, and suitable program modules or combinations of program modules may be used by those skilled in the art according to practical conditions. These combinations of program modules, when executed by the processor 1610, cause the processor 1610 to perform, for example, the method flows described above with reference to FIGS. 1-3, and any variations thereof.

According to the embodiments of the disclosure, the processor 1610 may use the output interface 1630 and the input interface 1640 to perform the method flow described above with reference to FIG. 10, 11 or 14, and any variations thereof.

So far, the method supporting reliable session transmission, the session setup method and the handover method according to the disclosure have been described. With these methods, two redundant PDU sessions may be set up on two base stations respectively, to ensure the reliability of the service transmission, and reduce the delay of the transmission by using the method for selecting a UPF according to the disclosure. At the same time, the handover method is provided, which can ensure the low delay and high reliability of the service transmission after the handover is completed.

It may be understood by those skilled in the art that the methods described above are merely exemplary. The method according to the disclosure is not limited to the steps and sequences described above. The base station and the user equipment described above may comprise more modules, for example, may further comprise modules available for the base station or the UE, which have been developed or will be developed in the future etc. The various identities described above are merely exemplary and not restrictive, and the disclosure is not limited to specific exemplary names of the identities. Many variations and modifications may be made by those skilled in the art in light of the teachings of the embodiments described.

It may be understood by those skilled in the art that the embodiments of the present application comprise devices related to performing one or more of the operations described in the present application. These devices may be specially designed and manufactured for the required purposes, or may also comprise known devices in a general purpose computer. These devices have computer programs stored therein which are selectively activated or reconfigured. Such computer programs may be stored in a device (for example, computer) readable medium or in any types of media suitable for storing electronic instructions and respectively coupled to a bus, including, but not limited to, any types of disks (including a floppy disk, a hard disk, an optical disk, a compact disc-read-only memory (CD-ROM), and a magneto-optical disk), a read-only memory (ROM), a random access memory (RAM), an erasable programmable read-only memory (EPROM), an electrically erasable programmable read-only memory (EEPROM), a flash memory, a magnetic card or a light card. That is, the readable medium comprises any medium which is used by a device (for example, a computer) to store or transmit information in a readable form.

It may be understood by those skilled in the art that each block of the structural diagrams and/or block diagrams and/or flow diagrams and combinations thereof may be implemented by computer program instructions. It may be understood by those skilled in the art that these computer program instructions may be implemented by a general purpose computer, a professional computer, or a processor of other programmable data processing methods, so that solutions specified in one or more blocks of the structural diagrams and/or block diagrams and/or flow diagrams disclosed in the disclosure are executed by the computer or the processor of other programmable data processing methods.

It may be understood by those skilled in the art that steps, measures, and solutions in various operations, methods, and flows which have been discussed in the disclosure may be alternated, modified, combined, or deleted. Further, other steps, measures, and solutions in various operations, methods, and flows which have been discussed in the disclosure may be alternated, modified, rearranged, decomposed, combined, or deleted. Further, steps, measures, and solutions in various operations, methods, and flows which are in the related art and have been discussed in the disclosure may be alternated, modified, rearranged, decomposed, combined, or deleted.

The above description is merely some embodiments of the disclosure, and it should be illustrated that those of ordinary skill in the art can also make several improvements and retouches without departing from the principles of the present application. These improvements and retouches should be considered to fall within the protection scope of the disclosure.

The invention claimed is:

1. A method performed by a session management function (SMF) in a wireless communication system, the method comprising:
   receiving, from an access and mobility management function (AMF), a request associated with a protocol data unit (PDU) session;
   determining whether PDU session to be handled redundantly based on the request associated with the PDU session;
   transmitting, to the AMF, information associated with redundant handling of the PDU session,
   wherein the request associated with the PDU session includes a data network name (DNN) and single network slice selection assistance information (S-NSSAI), and
   wherein the information associated with the redundant handling of the PDU session differentiates the PDU session handled redundantly; and
   receiving, from the AMF, information on cause indicating that the information associated with the redundant handling of the PDU session is unavailable.

2. The method of claim 1, further comprising:
   transmitting a N4 session setup request message to a user plane function (UPF); and
   receiving a N4 session setup response message from the UPF.

3. The method of claim 1,
   further comprising:
   receiving, from the AMF, PDU session ID, identity of a secondary next generation-radio access network (S-NG-RAN) node, and information of a downlink tunnel.

4. The method of claim 3, further comprising:
   selecting a user plane function (UPF) based on the identity of the S-NG-RAN node; and
   transmitting, to the UPF, a N4 session modification request message,
   wherein the N4 session modification request message includes the information of the downlink tunnel.

5. The method of claim 1, further comprising:
   determining whether to release a PDU session of the PDU session or not in case that the information associated with the redundant handling of the PDU session is unavailable.

6. The method of claim 1, further comprising:
receiving, from the AMF, information of a path switch request, wherein a target next generation-radio access network (NG-RAN) node receives a handover request from the NG-RAN node,
wherein the information of the path switch request includes information of a downlink tunnel and an identity of a S-NG-RAN node.

7. The method of claim 1, wherein an NG-RAN node sets up independent user plane paths for redundant user planes for the PDU session.

8. A method performed by a next generation-radio access network (NG-RAN) node in a wireless communication system, the method comprising:
receiving, from an access and mobility management function (AMF), information associated with redundant handling of a protocol data unit (PDU) session,
wherein the information associated with redundant handling of the PDU session differentiates the PDU session handled redundantly; and
transmitting, to the AMF, information on cause indicating that the information associated with the redundant handling of the PDU session is unavailable.

9. The method of claim 8, further comprising:
transmitting, to a secondary NG-RAN(S-NG-RAN) node, a SN addition request message; and
receiving, from the S-NG-RAN node, a SN addition request acknowledgement message,
wherein the SN addition request message includes information indicating the PDU sessions are used for redundant related to a bearer terminated by the S-NG-RAN node,
wherein the information indicating the PDU sessions is stored by the S-NG-RAN node, and
wherein the SN addition request acknowledgement message includes information of a downlink tunnel related to the bearer terminated by the S-NG-RAN node.

10. The method of claim 9, further comprising:
transmitting, to the AMF, a PDU session modify indication message,
wherein the PDU session modify indication message includes identity of the S-NG-RAN node and the information of the downlink tunnel related to the bearer terminated by the S-NG-RAN node.

11. The method of claim 8,
further comprising:
transmitting, to the AMF, PDU session ID, identity of a secondary NG-RAN(S-NG-RAN) node and information of a downlink tunnel.

12. The method of claim 8, further comprising:
transmitting, to a target NG-RAN node, a handover request message including the information indicating that the PDU sessions are used for redundant,
wherein the handover request message is stored and used for setting up by the target NG-RAN node.

13. The method of claim 8, further comprising:
setting up independent user plane paths for redundant user planes for the PDU sessions.

14. A session management function (SMF) in a wireless communication system, the SMF comprising:
at least one transceiver; and
at least one processor operably connected to the at least one transceiver,
wherein the at least one processor is configured to:
receive, from an access and mobility management function (AMF), a request associated with a protocol data unit (PDU) session;
determine whether PDU session to be handled redundantly based on the request associated with the PDU session;
transmit, to the AMF, information associated with redundant handling of the PDU session,
wherein the request associated with the PDU session includes a data network name (DNN) and single network slice selection assistance information (S-NSSAI), and
wherein the information associated with the redundant handling of the PDU session differentiates the PDU session handled redundantly; and
receiving, from the AMF, information on cause indicating that the information associated with the redundant handling of the PDU session is unavailable.

* * * * *

UNITED STATES PATENT AND TRADEMARK OFFICE
CERTIFICATE OF CORRECTION

PATENT NO. : 12,156,266 B2
APPLICATION NO. : 17/290420
DATED : November 26, 2024
INVENTOR(S) : Lixiang Xu et al.

Page 1 of 1

It is certified that error appears in the above-identified patent and that said Letters Patent is hereby corrected as shown below:

In the Claims

1. Claim 1, Column 32, Line 30, "whether PDU session" should read -- whether the PDU session --

2. Claim 1, Column 32, Lines 40-41, "differentiates the PDU session handled" should read -- differentiates PDU sessions handled --

3. Claim 8, Column 33, Lines 19-20, "differentiates the PDU session handled" should read -- differentiates PDU sessions handled --

4. Claim 14, Column 34, Line 27, "whether PDU session" should read -- whether the PDU session --

5. Claim 14, Column 34, Lines 37-38, "differentiates the PDU session handled" should read -- differentiates PDU sessions handled --

Signed and Sealed this
Twenty-ninth Day of July, 2025

Coke Morgan Stewart
*Acting Director of the United States Patent and Trademark Office*